United States Patent
Wessel et al.

(10) Patent No.: US 10,032,468 B1
(45) Date of Patent: Jul. 24, 2018

(54) HEAT-ASSISTED MAGNETIC RECORDING HEAD CONFIGURED TO CONDUCT HEAT AWAY FROM SLIDER COMPONENTS TO A SUBSTRATE

(71) Applicant: Seagate Technology LLC, Cupertino, CA (US)

(72) Inventors: James Gary Wessel, Savage, MN (US); Zoran Jandric, St. Louis Park, MN (US); Vasudevan Ramaswamy, Eden Prairie, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/344,851

(22) Filed: Nov. 7, 2016

Related U.S. Application Data

(60) Provisional application No. 62/252,000, filed on Nov. 6, 2015.

(51) Int. Cl.
*G11B 11/00* (2006.01)
*G11B 5/31* (2006.01)
*G11B 5/48* (2006.01)
*G11B 5/00* (2006.01)
*G11B 11/105* (2006.01)
*G11B 5/60* (2006.01)

(52) U.S. Cl.
CPC .......... *G11B 5/3133* (2013.01); *G11B 5/4866* (2013.01); *G11B 5/6088* (2013.01); *G11B 11/10534* (2013.01); *G11B 11/10536* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,452,740 B1 | 9/2002 | Ghoshal |
| 6,950,280 B2 | 9/2005 | Rea et al. |
| 7,102,853 B2 | 9/2006 | Macken et al. |
| 7,391,590 B2 | 6/2008 | Matono et al. |
| 7,612,965 B2 | 11/2009 | Kurihara et al. |
| 8,031,432 B2 | 10/2011 | Hsiao et al. |
| 8,164,855 B1 | 4/2012 | Gibbons et al. |
| 8,286,329 B1 | 10/2012 | Zhao et al. |
| 8,325,570 B1 | 12/2012 | Tanaka et al. |
| 8,339,739 B2 | 12/2012 | Balamane et al. |
| 8,486,286 B1 | 7/2013 | Gao et al. |
| 868,731 A1 | 4/2014 | Meloche et al. |
| 8,687,318 B2 | 4/2014 | Meloche et al. |
| 8,721,902 B1 | 5/2014 | Wang et al. |

(Continued)

OTHER PUBLICATIONS

U.S. Appl. No. 15/095,888, filed Apr. 11, 2016, Wessel et al.

(Continued)

*Primary Examiner* — Tan X Dinh
(74) *Attorney, Agent, or Firm* — Hollingsworth Davis, LLC

(57) ABSTRACT

An apparatus comprises a slider configured for heat assisted magnetic recording and comprising a substrate. At least one component of the slider generates heat when energized. At least one thermal via extends through a portion of the slider from a location proximate the component to the substrate. The thermal via is configured to conduct heat away from the component and to the substrate.

18 Claims, 20 Drawing Sheets

(56) References Cited

U.S. PATENT DOCUMENTS

| | | | |
|---|---|---|---|
| 8,947,986 B1 | 2/2015 | Araki et al. | |
| 9,019,661 B2 | 4/2015 | Rea | |
| 9,196,269 B2 | 11/2015 | Cao et al. | |
| 9,251,830 B1 | 2/2016 | Duda et al. | |
| 9,875,761 B1* | 1/2018 | Mehfuz | G11B 5/4866 |
| | | | 369/13.33 |
| 2008/0055784 A1* | 3/2008 | Shimazawa | G11B 5/02 |
| | | | 369/13.33 |
| 2008/0170319 A1* | 7/2008 | Seigler | G11B 5/02 |
| | | | 369/13.33 |
| 2008/0253025 A1 | 10/2008 | Fu et al. | |
| 2009/0034121 A1 | 2/2009 | Ohta et al. | |
| 2009/0052078 A1* | 2/2009 | Tanaka | G11B 5/02 |
| | | | 369/13.33 |
| 2011/0205860 A1* | 8/2011 | Chou | G11B 5/314 |
| | | | 369/13.24 |
| 2011/0216634 A1* | 9/2011 | Chou | G11B 11/00 |
| | | | 369/13.24 |
| 2011/0228419 A1* | 9/2011 | Tanaka | G11B 5/314 |
| | | | 369/13.33 |
| 2011/0228420 A1* | 9/2011 | Hara | G11B 5/314 |
| | | | 369/13.33 |
| 2011/0286128 A1 | 11/2011 | Tsutsumi et al. | |
| 2011/0317528 A1 | 12/2011 | Miyauchi et al. | |
| 2012/0008233 A1* | 1/2012 | Hirano | G11B 5/3106 |
| | | | 369/13.33 |
| 2012/0075965 A1* | 3/2012 | Tanaka | G11B 5/1278 |
| | | | 369/13.33 |
| 2012/0099407 A1* | 4/2012 | Hipwell | G11B 5/105 |
| | | | 369/13.32 |
| 2012/0113770 A1 | 5/2012 | Stipe | |
| 2013/0091695 A1* | 4/2013 | Shimazawa | B82Y 20/00 |
| | | | 369/13.32 |
| 2013/0229730 A1* | 9/2013 | Hirata | G11B 5/314 |
| | | | 369/13.33 |
| 2017/0025139 A1* | 1/2017 | Jones | G11B 5/72 |
| | | | 369/13.33 |
| 2017/0243607 A1 | 8/2017 | Sasaki et al. | |
| 2018/0040344 A1* | 2/2018 | Hutchinson | G11B 5/6082 |
| | | | 369/13.33 |

OTHER PUBLICATIONS

U.S. Appl. No. 15/227,319, filed Aug. 3, 2016, Hutchinson et al.
Sep. 6, 2017, File History for U.S. Appl. No. 15/095,888.
File History for U.S. Appl. No. 15/227,319.

\* cited by examiner

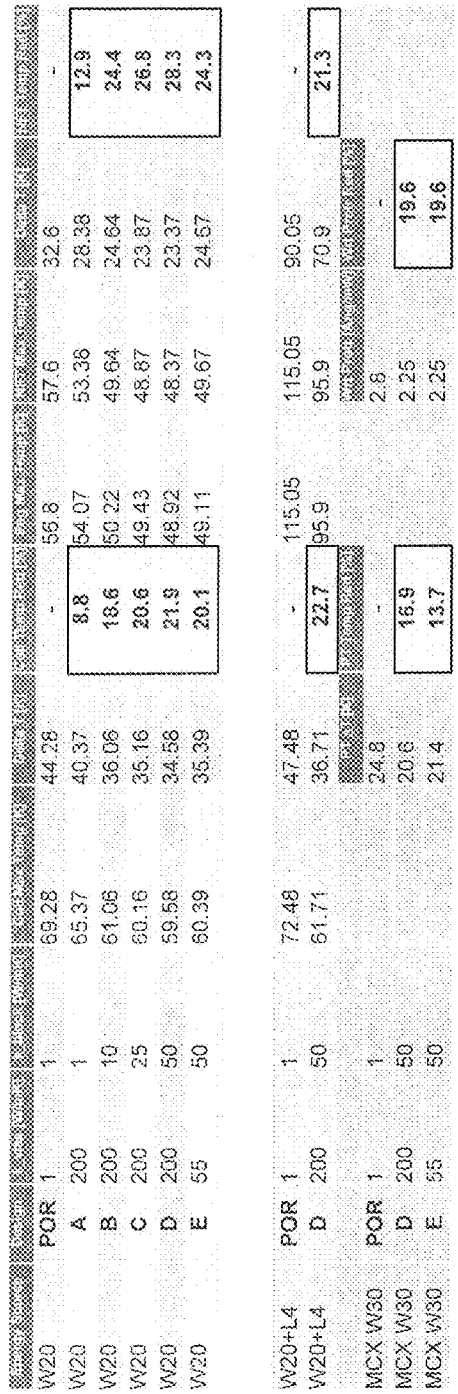
*FIGURE 12*
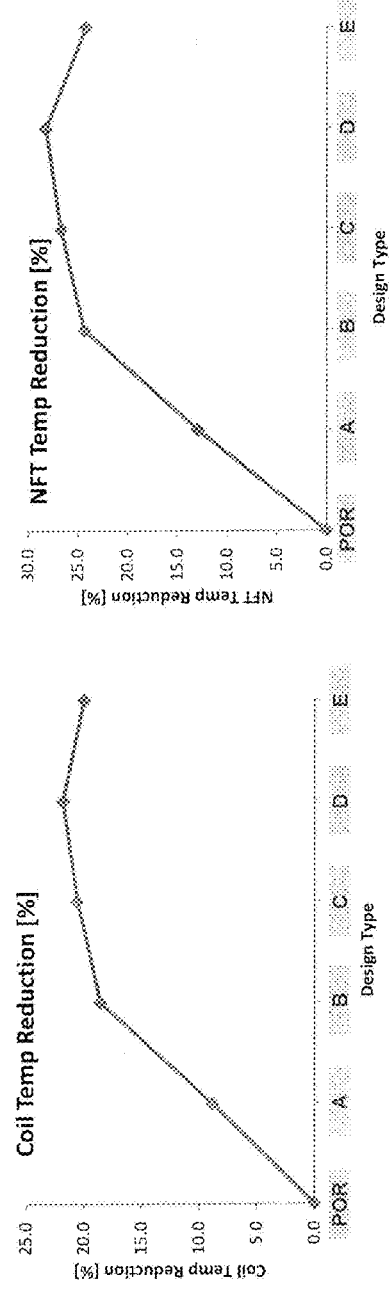
*FIGURE 13*
*FIGURE 14*

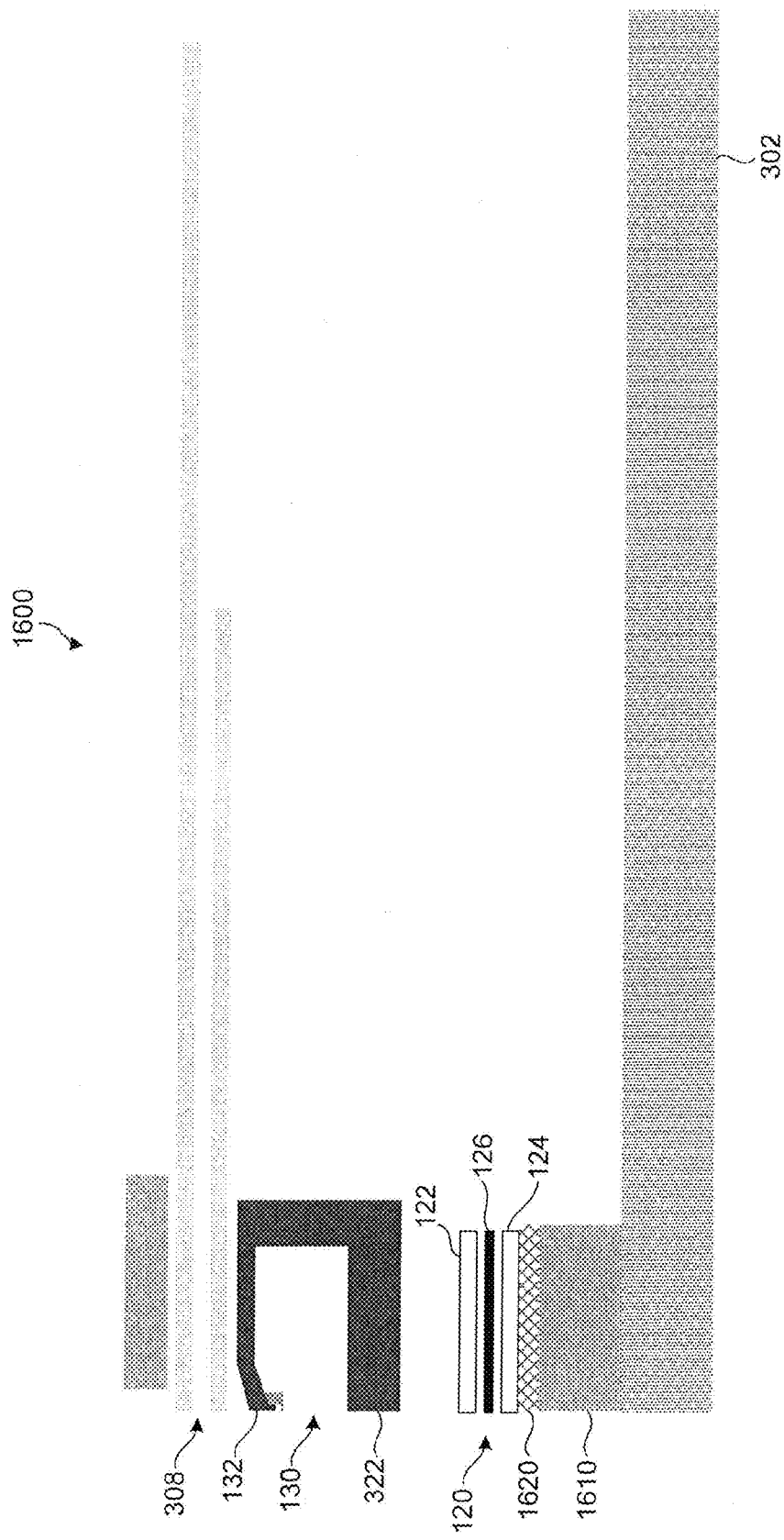

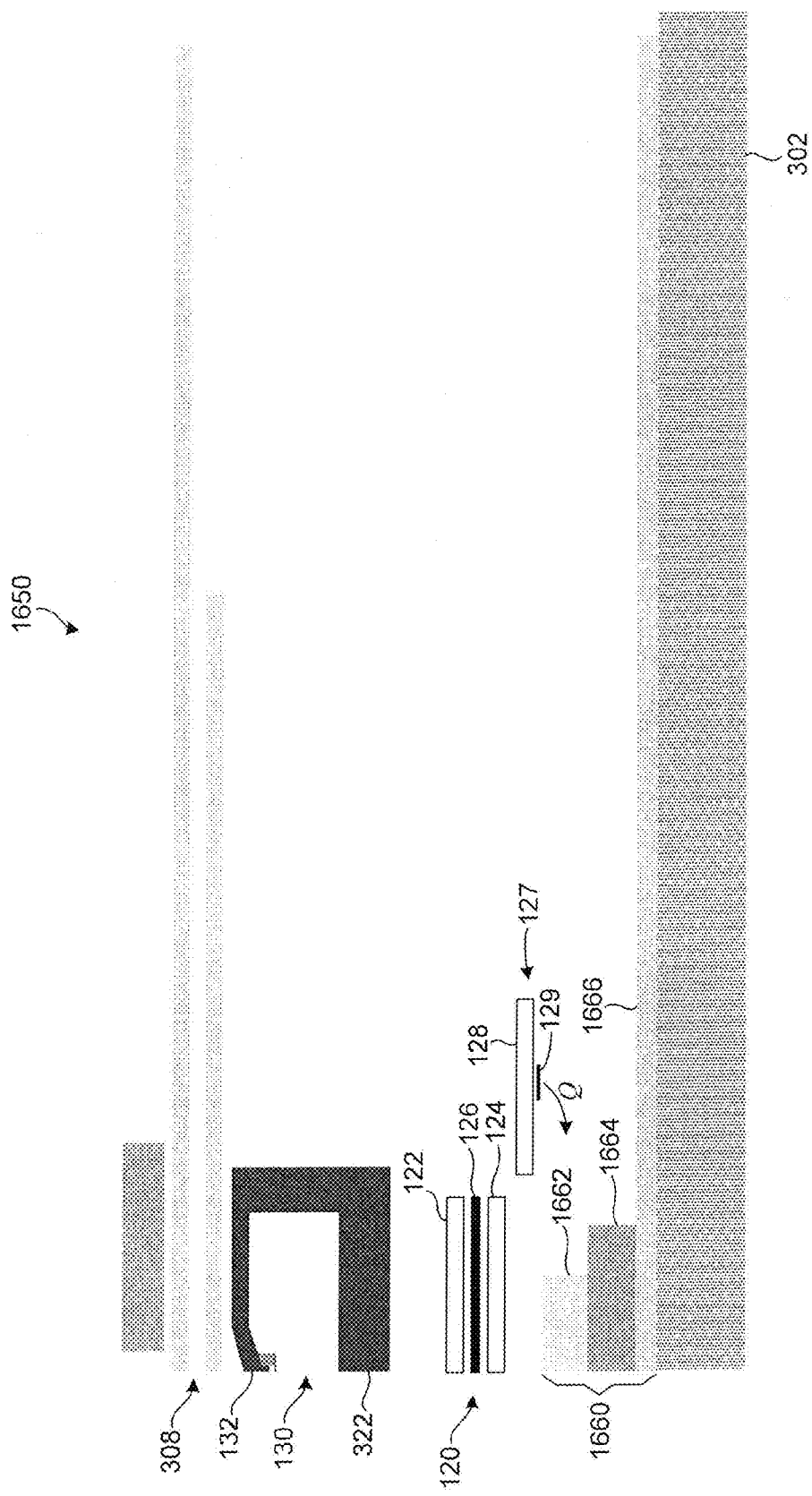

HEAT-ASSISTED MAGNETIC RECORDING HEAD CONFIGURED TO CONDUCT HEAT AWAY FROM SLIDER COMPONENTS TO A SUBSTRATE

RELATED PATENT DOCUMENTS

This application claims the benefit of Provisional Patent Application Ser. No. 62/252,000 filed on Nov. 6, 2015, to which priority is claimed pursuant to 35 U.S.C. § 119(e), and which is incorporated herein by reference in its entirety.

SUMMARY

Embodiments of the disclosure are directed to an apparatus comprising a slider configured for heat assisted magnetic recording and including a substrate. At least one component of the slider generates heat when energized. At least one thermal via extends through a portion of the slider from a location proximate the component to the substrate. The thermal via is configured to conduct heat away from the component and to the substrate.

Other embodiments are directed to an apparatus comprising a slider having a substrate. The slider comprises a writer which includes a write pole, a return pole, and a write coil arrangement. The slider also comprises an optical waveguide configured to receive light from a light source and a near-field transducer proximate the write pole. One or more thermal vias extend through a portion of the slider from a location proximate the write coil arrangement to the substrate. The one or more thermal vias are configured to conduct heat away from the write coil arrangement and to the substrate.

Further embodiments are directed to a method comprising energizing at least one component disposed on a slider configured for heat-assisted magnetic recording. The method also comprises conducting heat away from the at least one component by one or more thermal vias extending through a portion of the slider, and conducting the heat from the one or more thermal vias to a substrate of the slider.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 12 shows modeling data for five different slider designs relative to a baseline design;

FIG. 13 is a graph showing write coil temperature reduction data for each of the slider designs listed in FIG. 12;

FIG. 14 is a graph showing near-field transducer temperature reduction data for each of the slider designs listed in FIG. 12;

FIG. 16A shows a slider which incorporates a thermal via for cooling a reader in accordance with various embodiments;

FIG. 16B shows a slider which incorporates a thermal via for cooling a write pole of a writer in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Figure 1:
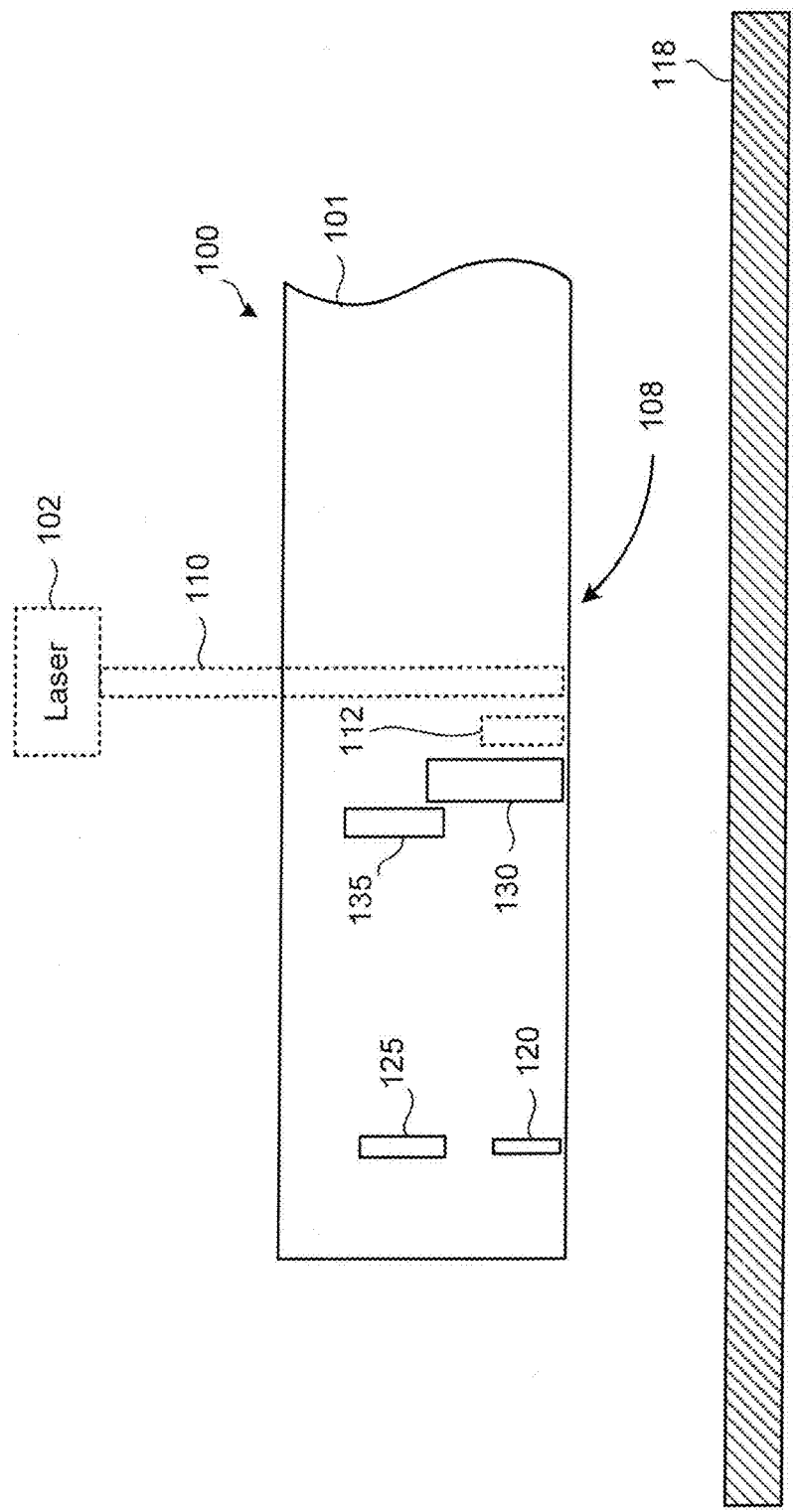
FIG. 1 is a side view of a hard drive slider with which embodiments of the present disclosure can be implemented.

FIG. 1 shows a recording head arrangement in accordance with various embodiments. The recording head arrangement includes a slider 100 positioned proximate a rotating magnetic recording medium 118. The slider 100 includes a reader 120 and a writer 130 proximate an air bearing surface (ABS) 108 for respectively reading and writing data from/to the magnetic recording medium 118. The writer 130 includes a corresponding heater 135, and the reader 120 also includes a corresponding heater 125 according to various embodiments. Each of the heaters 125 and 135 is thermally coupled to the slider body 101 and may be a resistive heater that generates heat as electrical current is passed therethrough. The writer heater 135 can be powered to cause protrusion of the ABS 108 predominately in the ABS region at or proximate the writer 130, and the reader heater 125 can be powered to cause protrusion of the ABS 108 predominately in the ABS region at or proximate the reader 120. Activation of both the writer and reader heaters 135 and 125 causes protrusion of the pole tip region of the slider body 101 which includes both the writer 130 and the reader 120. Power can be controllably delivered independently to the heaters 125 and 135 to adjust the fly height (e.g., clearance) of the slider 100 relative to the surface of the recording medium 118.

According to some embodiments, the recording head arrangement shown in FIG. 1 can be configured for heat-assisted magnetic recording. In such embodiments, a near-field transducer (NFT) 112 is located proximate the writer 130 and is optically coupled to a laser arrangement including light source 102 (e.g., laser diode). The light source 102 can be mounted external, or integral, to the slider 100. The light source 102 energizes the NFT 112 via a waveguide 110 which is optically coupled to the light source 102. It is understood that embodiments of the disclosure may be implemented in a wide variety of recording heads, including those configured for HAMR.

Heat-assisted magnetic recording, also referred to as energy-assisted media recording (EAMR), thermally-assisted media recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to bits randomly changing state.

In order to achieve desired data density, a HAMR recording head (e.g., slider) includes optical components that direct light from a laser diode to the recording medium. The HAMR media hotspot may need to be smaller than a half-wavelength of light available from current sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT is designed to support local surface plasmon excitation at a designed light wavelength. At resonance, high electric field surrounds the NFT due to the collective oscillation of electrons in the metal. Part of the field will tunnel into a storage medium and get absorbed, raising the temperature of the medium locally for recording. During recording, a write element (e.g., write pole) applies a magnetic field to the heated portion of the medium. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium while it is moving, data is encoded onto the medium.

Figure 2:
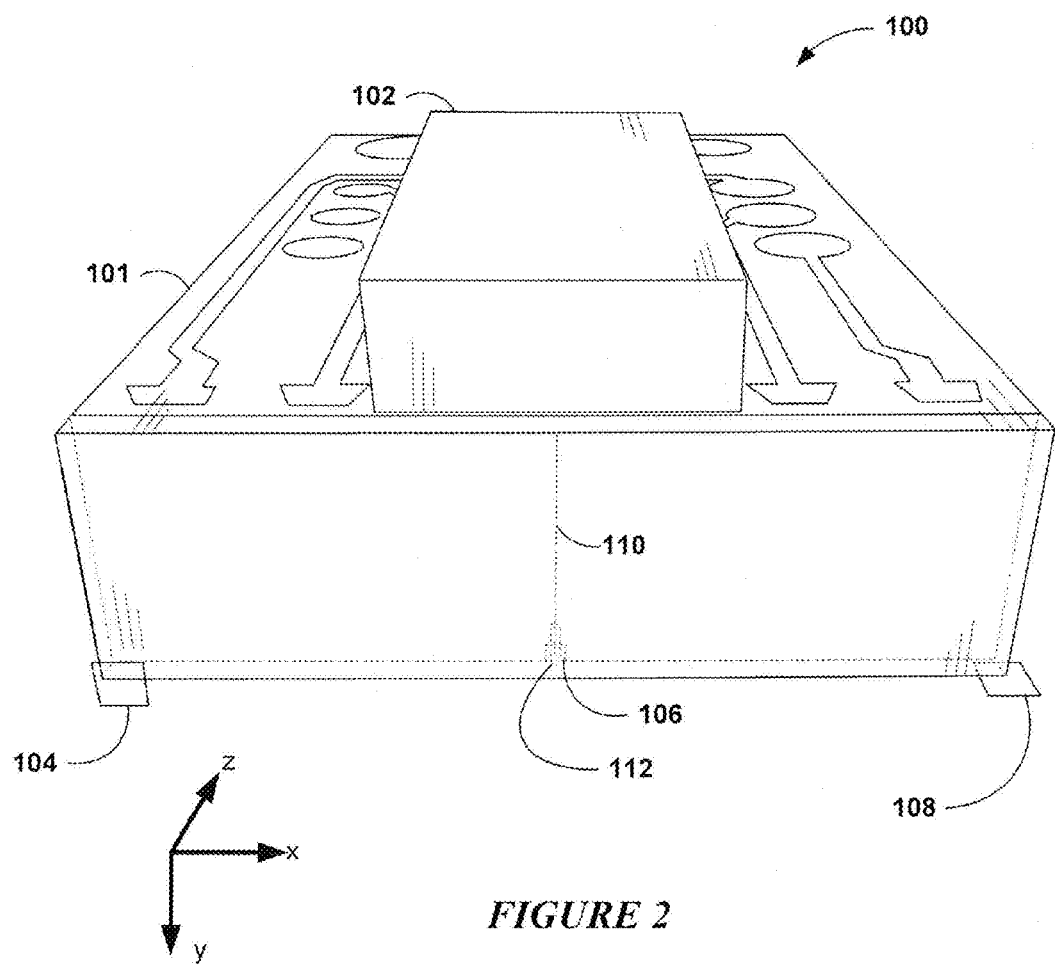
FIG. 2 is a perspective view of a hard drive slider configured for heat-assisted magnetic recording (HAMR) in accordance with various embodiments.

With reference now to FIG. 2, a perspective view shows a HAMR hard drive slider 100 that may be implemented in accordance with various embodiments of the disclosure. The HAMR slider 100 (also referred to as a read/write head or recording head) utilizes an energy source, which in this example is a laser diode 102 located on top of and proximate to a trailing edge surface 104 of a slider body 101. The laser diode 102 delivers light proximate to a read/write transducer 106, which is proximate an ABS 108 (also referred to as a media-facing surface) of the slider body 101. The media-facing surface 108 is held proximate to a moving magnetic medium surface (not shown) during device operation. The read/write transducer 106 may include, among other things, a magnetoresistive reader element and a magnetic write coil arrangement that energizes a write pole. As will be discussed hereinbelow, the write coil arrangement generates an appreciable amount of heat during write operations, which if unmanaged can degrade performance and longevity of the slider 100.

The laser diode 102 provides electromagnetic energy to heat the magnetic medium surface as it passes by the read/write transducer 106. Optical coupling components, such as a channel waveguide 110 and a plasmonic NFT 112, are formed integrally within the HAMR slider 100 to deliver light from laser diode 102 to a region proximate the read/write transducer 106. The light energizes the NFT 112, which provide local heating of the recording medium during write operations. The laser diode 102 in this example may be an integral, edge-emitting device, although it will be appreciated that the waveguide 110 and NFT 112 may be used with any light source. For example, a surface emitting laser (SEL) may be used instead of an edge-emitting laser, and a laser may be mounted elsewhere, or in different orientation, e.g., on the trailing edge surface 104 of the slider body 101.

While the embodiment illustrated in FIG. 2 shows the laser diode 102 integrated with the HAMR slider 100, the waveguide 110 and NFT 112 discussed herein may be useful in any type of light delivery configuration. For example, in what is referred to as free-space light delivery, a laser may be mounted externally to the slider, and coupled to the slider by way of optic fibers and/or waveguides. The slider in such an arrangement may include a grating coupler into which light is coupled and delivered to a slider-integrated waveguide 110 which energizes NFT 112.

The waveguide 110 extends from the media-facing surface 108 towards the laser diode 102. There may be intermediary optical components between the laser diode 102 and waveguide 110, such as lenses, mirrors, collimators, phase-shifters, other waveguides, etc. For purposes of this discussion, the waveguide 110 will refer to a contiguous light propagation conduit that delivers light energy proximate to the NFT, the light originating either directly from the laser diode 102 or indirectly via some other intermediary optical component.

During operation, light propagates through the waveguide 110 along the negative y-direction. Electrical field lines emanate from the waveguide 110 and excite the NFT 112. The NFT 112 delivers surface plasmon-enhanced, near-field electromagnetic energy along the negative y-direction where it exits at the media-facing surface 108. This results in a highly localized hot spot on the recording medium. A write pole of the writer of the read/write transducer is located alongside the NFT 112. The write pole generates a magnetic field (e.g., perpendicular field) used in changing the magnetic orientation of the hotspot during writing.

The electromagnetic energy delivered to the NFT 112 via the laser diode 102 and waveguide 110 induces surface plasmon resonance at the NFT 112, and the surface plasmons are directed to create a small hotspot (e.g., 60 nm or smaller) on a recording medium as it moves past the NFT 112 in the downtrack direction (z-direction). The heat lowers magnetic coercivity of the medium, allowing a magnetic flux to change magnetic orientation of the medium near the hotspot without changing magnetic orientation outside of the hotspot. A write pole of the read/write transducer 106 applies the magnetic flux near the media-facing surface 108 in response to applying a current to coil magnetically coupled to the write pole. Because the energy is focused in a relatively small volume of the slider body 101, significant temperature increases are seen near the writer of the read/write transducer 106 and the NFT 112 during recording. This is due to, among other things, heat generated by the write coil arrangement of the writer when energized during write operations.

Figure 3:
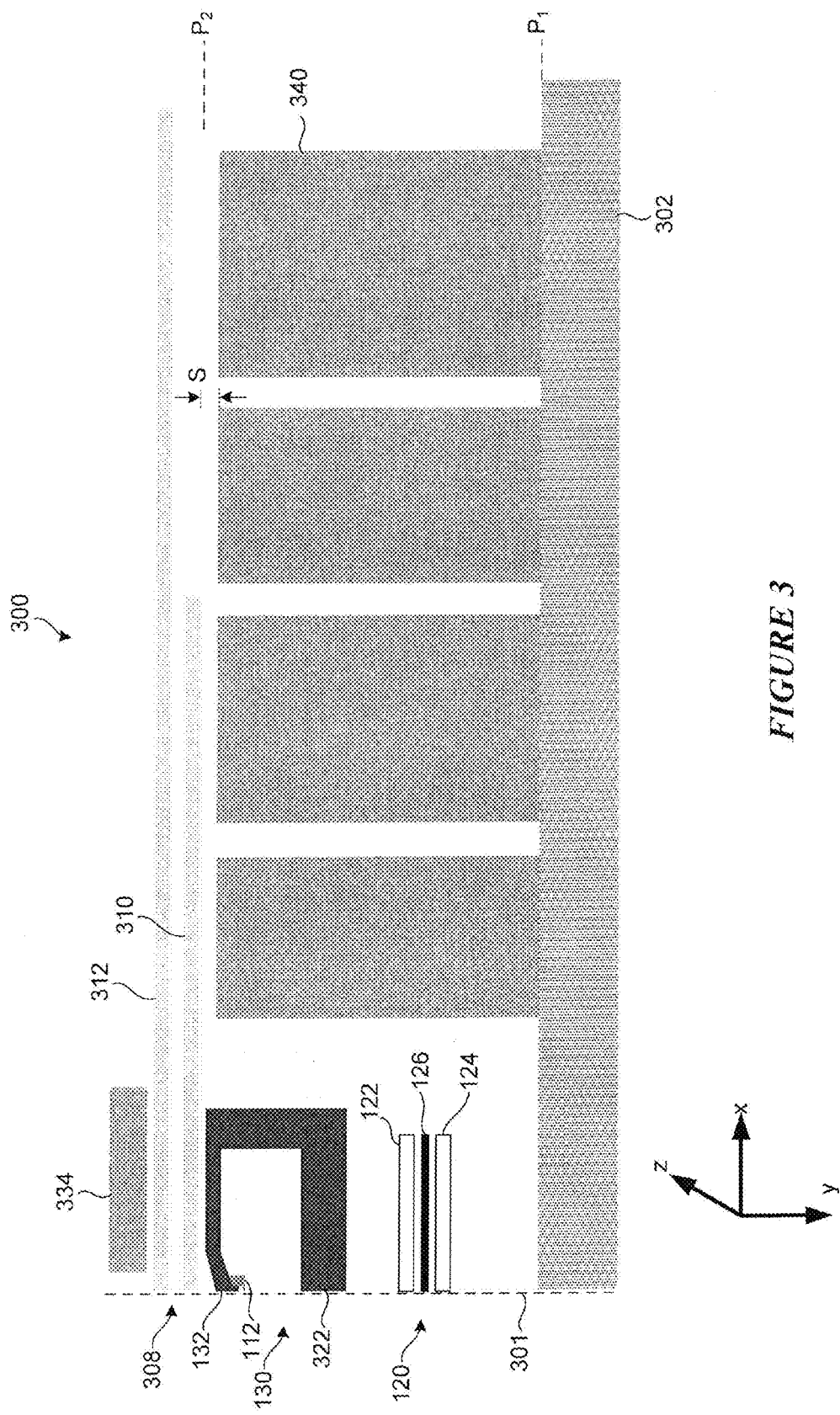
FIG. 3 illustrates a slider which incorporates a multiplicity of thermal vias for cooling a write coil arrangement in accordance with various embodiments.

FIG. 3 illustrates a portion of the slider 300 with which embodiments of the present disclosure can be implemented. The portion of the slider 300 shown in FIG. 3 includes a substrate 302 upon which several slider components are situated. The slider 300 includes in air bearing surface 301 which is indicated by the dashed line normal to a plane, $P_1$, of the substrate 302. A number of components are shown at or near the ABS 301. Each of the components situated to the ABS 300 generates heat when energized. For example, a writer 130 includes a write pole 132 coupled to a return pole 322 and, in accordance with some embodiments, an axillary return pole 334. Although not shown in FIG. 3, the auxiliary return pole 334 is coupled to the write pole 132 by way of a magnetic via. The slider 300 also includes a reader 120 comprising a reader element 126 disposed between a pair of reader shields 122 and 124.

In some embodiments, the slider 300 is configured for heat-assisted magnetic recording. In other embodiments, the slider 300 is configured for conventional magnetic recording (i.e., not configured for HAMR). In the embodiment illustrated in FIG. 3, the slider 300 is implemented for HAMR and is shown to include a near-field transducer 132 situated proximate the write pole 132 of the writer 130. A heat sink is typically disposed between the NFT 112 and the write pole 132. Although not shown in FIG. 3, a HAMR slider 300 includes an optical waveguide, such as a planar or channel waveguide, extending through the slider body and optically coupled to the NFT 112 and a light source, such as a laser diode. It is understood that for embodiments not configured for HAMR, the slider 300 would exclude the NFT 112, optical waveguide, and other optical components associated with a HAMR slider configuration.

The writer 130 is shown positioned proximate a write coil arrangement 308. In the embodiment shown in FIG. 3, the write coil arrangement 308 includes an upper coil 312 and a lower coil 310. In some embodiments, the upper coil 312 and lower coil 310 are configured according to a double-layer pancake coil design. It should be noted that, while write coil arrangements shown in the figures conform to a double-layer pancake coil design, embodiments of the disclosure are directed to any writer coil design, including a single-layer pancake design or a helical coil design, for example. With particular reference to FIG. 3, for example, the coil arrangement 308 can include a single coil, such as upper coil 312 and exclude the lower coil 310. In other embodiments, the coil arrangement 308 shown in FIG. 3 can have a helical design.

Sliders configured for heat-assisted magnetic recording are observed to have a problematic level of write-induced-writer-protrusion (WIWP) and writer coil generated heat. WIWP is an unintended, but an existing, heat induced protrusion of the write pole region of the slider. WIWP can fluctuate depending on the writer close points that are chosen for a given head design and therefore can reduce the control over accurately setting the writer clearance, for example. Reducing WIWP can be achieved by effectively cooling the write pole.

As was previously discussed, the slider 300 includes a writer heater and typically a reader heater that are used to control protrusion of the slider at the ABS 301 during write and read operations. Ideally, it is desirable that slider protrusion at the ABS 301 result only from the activation of the writer and/or reader heaters. However, various components of the slider 300 generate appreciable amounts of heat when energized. The heat produced by the energized slider components contributes to slider protrusion of the ABS 301 at the writer and/or reader. The additional heat sources that contribute to slider protrusion at the ABS 301 complicate various slider operations that rely on precise control of one or both of the writer and reader heaters, such as setting slider clearance, dynamic fly height adjustment, topographical evaluation (e.g., thermal asperity detection), and head-medium contact detection, for example.

Embodiments of the disclosure are directed to an apparatus that includes a slider comprising a substrate. At least one component of the slider generates heat when energized. At least one thermal via extends through a portion of the slider from a location proximate the component to the substrate. The thermal via is configured to conduct heat away from the component and to the substrate. In some embodiments, a multiplicity of components of the slider generate heat when energized, and at least one thermal via extends from a location proximate each of the components to the substrate, thereby conducting heat away from the multiplicity of components and to the substrate. The slider can be configured for heat-assisted magnetic recording according to various embodiments.

The writer coils, for example, generate considerable heat during writing due to Joule heating, hysteresis loss, and eddy current heating. Embodiments of the disclosure are directed to one or more relatively large thermally conductive vias within the slider that transfer writer-generated heat to the slider's ceramic substrate. More generally, one or more thermally conductive vias are provided within the body of the slider to transfer heat generated by one or more of the slider's heat generating components directly to the slider's ceramic substrate. The ceramic substrate, such as a substrate formed from AlTiC, serves as a cool and high-capacity thermal reservoir that is able to readily dissipate thermal energy due to exposure to high pressure airflow at the air bearing surface of the slider.

With continued reference to FIG. 3, the slider 300 includes a number of thermal vias 340 connected to and extending from the substrate 302 to a location proximate the write coil arrangement 308. The thermal vias 340 are configured to conduct heat away from the write coil arrangement 308 and directly to the substrate 302. The substrate 302 is a relatively large feature of the slider 300 that, because of its thermal conductivity (e.g., ~20-30 W/mK), can serve as a heat reservoir for conducting heat away from one or more components of the slider 300 that generate heat when energized. Unlike conventional thermal management approaches that dissipate heat within the same wafer plane (e.g., 2-dimensional heat transport) of the slider 300, the thermal vias 340 transport heat from a wafer plane at which a heat generating component resides, through intermediary wafer planes (e.g., 3-dimensional heat transport) of the slider body, and to the substrate 302.

For example, the substrate 302 is situated on a first plane, $P_1$, (e.g., $x_0$-$z_0$-$y_0$) of the slider 300. The write coil arrangement 308 resides on a second plane, $P_2$, (e.g., $x_0$-$z_0$-$y_1$) of the slider 300 that is parallel to and spaced apart from the first plane, $P_1$. The thermal vias 340 extend through a portion of the slider body from a location proximate the write coil arrangement 308 to the substrate 302. The thermal vias 340 are configured to conduct heat away from the write coil arrangement 308 residing on the second plane, $P_2$, transport this heat through the slider body (along the y-axis), and deliver this heat to the substrate 302 at the first plane, $P_1$.

According to some embodiments, the thermal vias 340 can be formed from a metal or metal alloy with good conductivity. Suitable metals or metal alloys include those containing Cu, W, Ag, Au, Al, and Ru, for example. When electrically conductive metal or metal alloy material is used to form the thermal vias 340, a space, S, is provided between the thermal vias 340 and the write coil arrangement 308 to prevent electrical shorting and to reduce or minimize capacitive coupling. For example, a spacing of between about 1-2 μm (e.g., ~1.2 μm) can separate the thermal vias 340 from the write coil arrangement 308.

Figure 4:
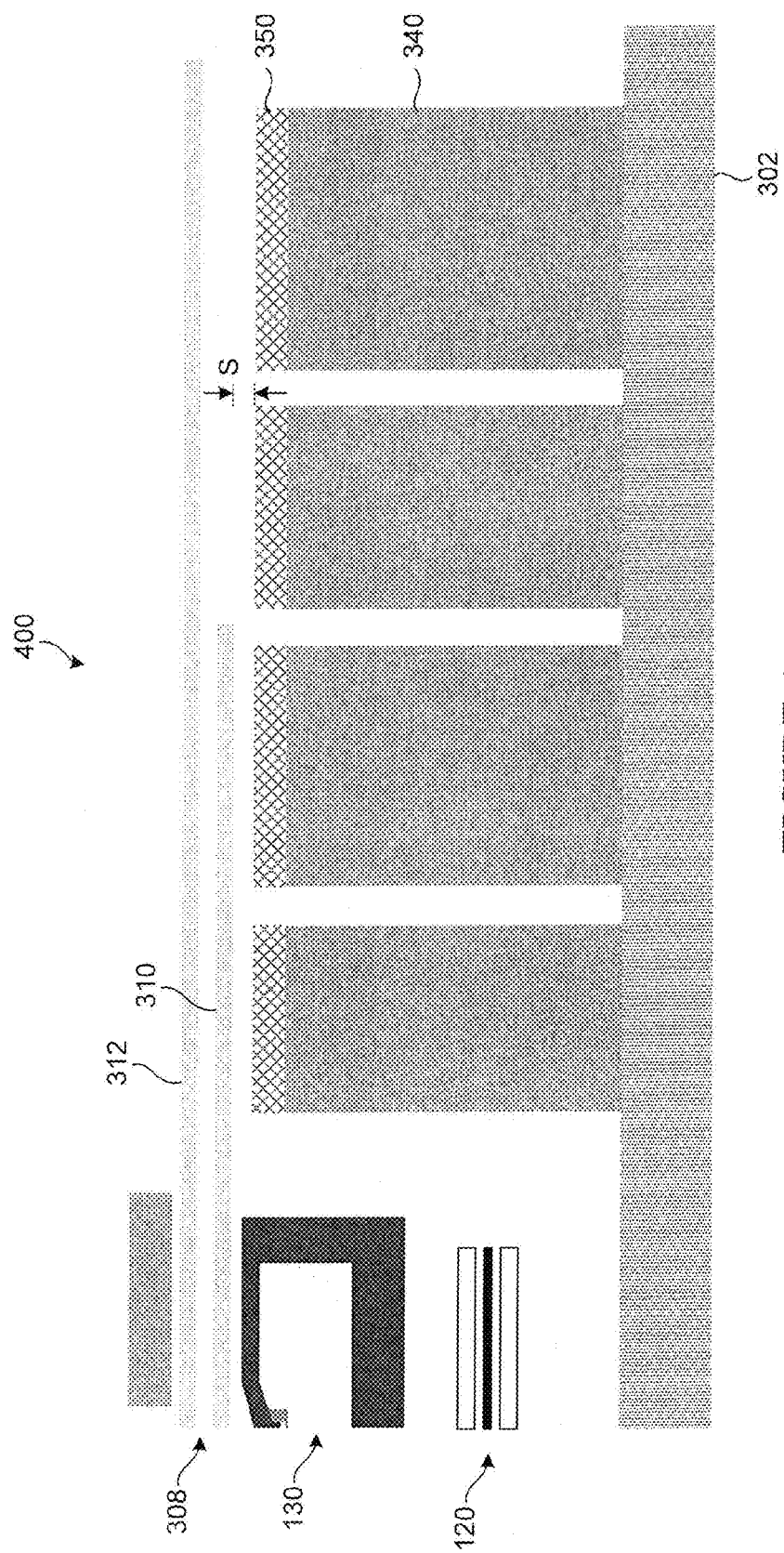
FIG. 4 illustrates a slider which incorporates a multiplicity of thermal vias for cooling a write coil arrangement in accordance with other embodiments.

In some embodiments, and with reference to the slider 400 shown in FIG. 4, a layer 350 of thermally conductive dielectric material can be disposed between the write coil arrangement 308 and the thermal vias 340. The dielectric material layer 350 provides good thermal conductivity and good electrical insulation between the write coil arrangement 308 and the thermal vias 340. Inclusion of the dielectric material layer 350 allows the spacing, S, to be reduced relative to an embodiment that excludes the dielectric material layer 350 (e.g., FIG. 3). Suitable thermally conductive dielectric materials for fabricating layer 350 include AlN, BeO, MgO, diamond, and graphene, for example. According to some embodiments, the thermal vias 340 can be formed entirely from a thermally conductive dielectric material, such as those useful for fabricating dielectric material layer 350. Forming thermal vias 340 entirely from the thermally conductive dielectric material provides for reduced spacing, S, and electrical insulation between the write coil arrangement 308 and the thermal vias 340, as well as good thermal conductivity therebetween.

Figure 5:
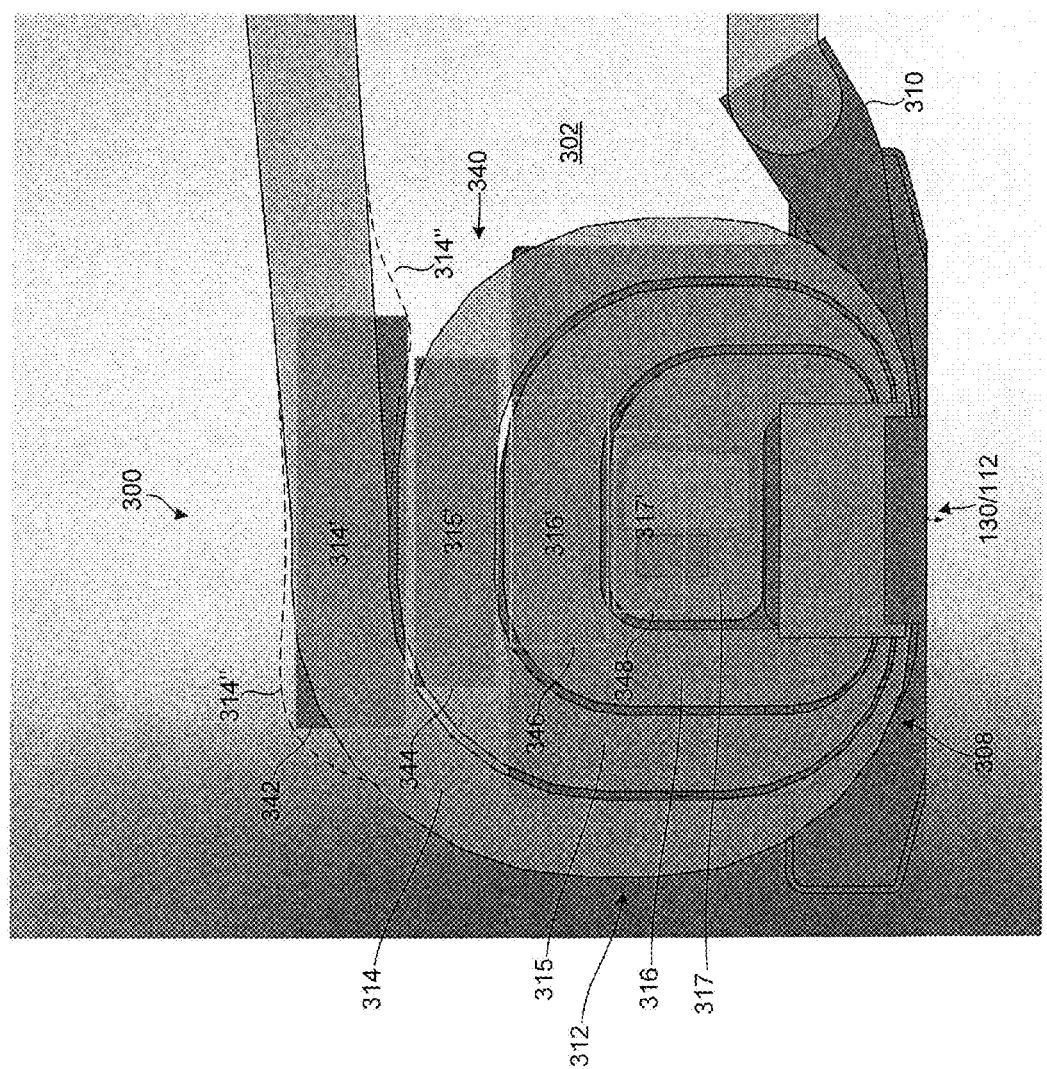
FIG. 5 is a top view of a portion of the slider shown in FIG. 4.
Figure 6:
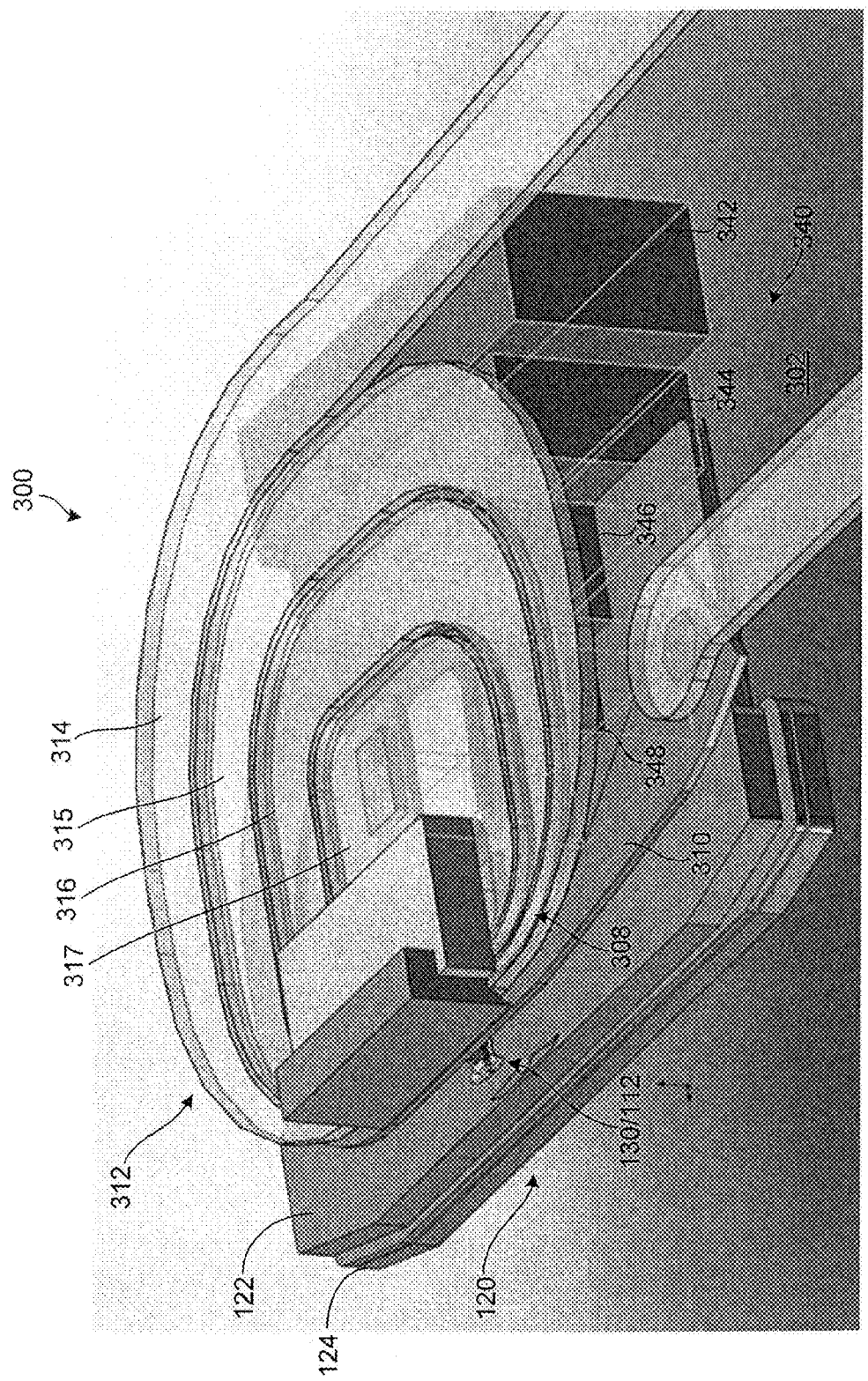
FIG. 6 is a perspective view of a portion of the slider shown in FIG. 4.

FIG. 5 is a top view of a write coil arrangement 308 thermally coupled to a multiplicity of thermal vias 340 in accordance with various embodiments. FIG. 6 is a perspective view of the write coil arrangement 308 shown in FIG. 5. In FIGS. 5 and 6, a top coil 312 of the write coil arrangement 308 is made transparent in order to show underlying features of the slider 300. The top coil 312 includes a number of coil turns including coil turns 314, 315, 316, and 317. An individual thermal via 342, 344, 346, 348 is positioned adjacent to and thermally coupled to one of the coil turns 314, 315, 316, 317. In the illustrative example shown in FIG. 5, the top coil 312 includes four coil turns. As such, the slider 300 includes four thermal vias 342, 344, 346, 348. Each coil turn 314, 315, 316, 317 of the top coil 312 and those of the lower coil 310 (coil turns visible through the top coil 312) includes a flattened region 314', 315', 316', 317'. The top surface of each thermal via 342, 344, 346, 348 is aligned with a corresponding flattened region 314', 315', 316', and 317' of the top coil 312. As can be seen in FIG. 3, the lower coil 310 extends over only two of the four thermal vias 340 included in the embodiment shown in FIGS. 3 and 4. In particular, the lower coil 310 includes two coil turns, one of which has a top surface aligned with flattened region 316' and the other of which has a top surface aligned with flattened region 317'.

As can be seen in FIG. 5, the top surface of the thermal vias 342, 344, 346, 348 are aligned with respect to each of the coil turns so that a significant percentage (e.g., 70-100%) of the top surface area of each thermal via 342, 344, 346, 348 is exposed to its respective coil turn 314, 315, 316, and 317 (preferably, but not necessarily, at the flattened regions 314', 315', 316', 317'). In accordance with some embodiments, the flattened region of each of the coil turns can be shaped to increase or maximize the surface area that is exposed to the top surface area of each of the thermal vias 340. FIG. 5, for example, shows a shaped region 314" of coil turn 314 that is designed to increase or maximize the surface area of the coil turn 314 that is exposed to the top surface of the thermal via 342. In other embodiments, the top surface (or entire surface) of the thermal vias 340 can be shaped to increase or maximize the surface area exposed to the coil turns. In further embodiments, the top surface (or entire surface) of the thermal vias 340 and regions of the coil turns can be shaped to increase or maximize the surface area for heat transfer between the thermal vias 340 and the coil turns.

Figure 7:
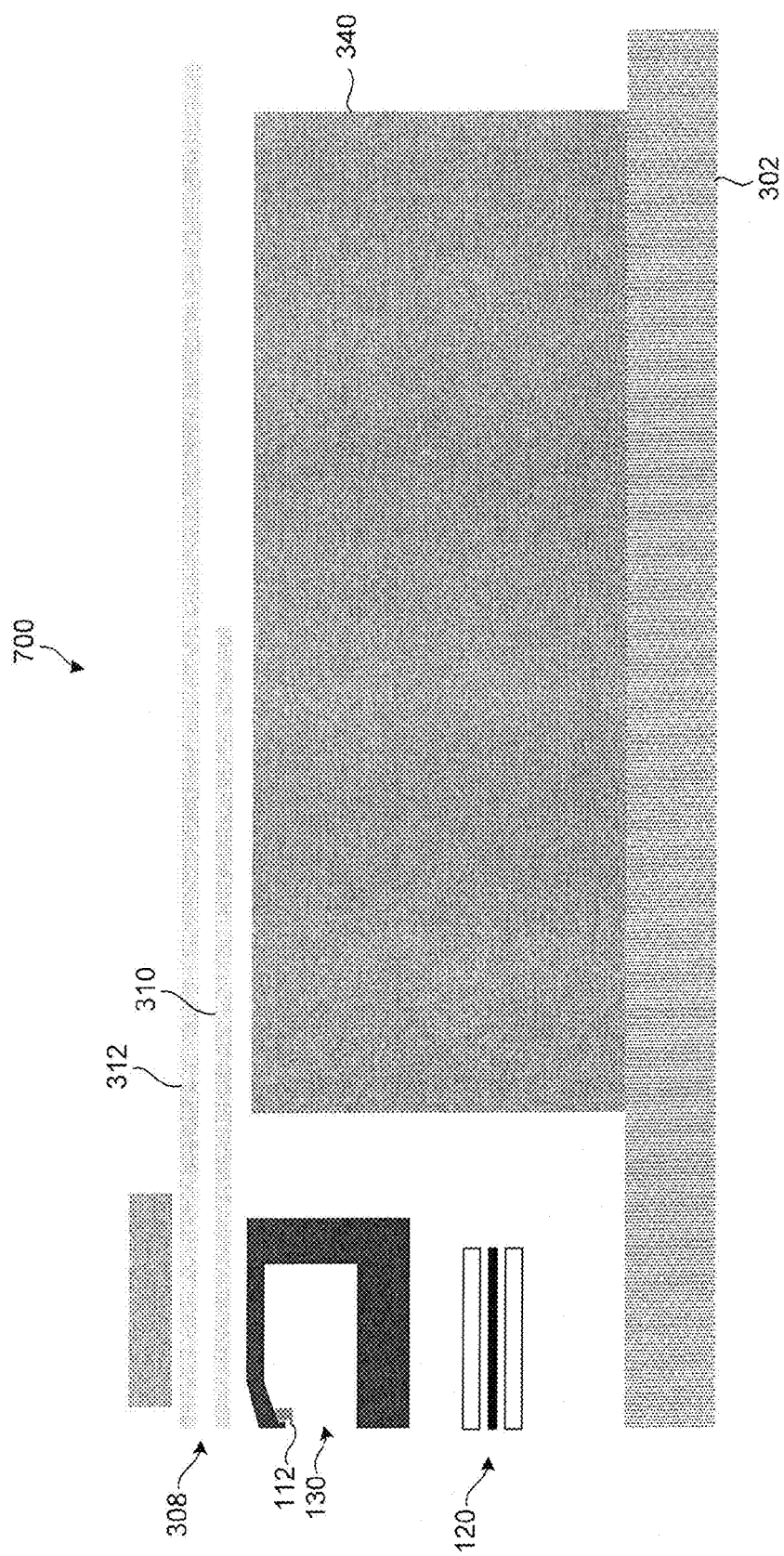
FIG. 7 illustrates a slider which incorporates a unitary thermal via for cooling a write coil arrangement in accordance with various embodiments.

FIG. 7 illustrates a slider 700 that incorporates a thermal via for cooling a write coil arrangement 308 in accordance with various embodiments. In the embodiment shown in FIG. 7, a single thermal via 340 is formed in the slider 700 and is configured to conduct heat away from the write coil arrangement 308 and transport this heat to the substrate 302 of the slider 700. The single thermal via 340 is fabricated to extend along a majority of the length of the write coil arrangement 308 (e.g., between about 60-90%). Although the view of the single thermal via 340 shown in FIG. 7 depicts the thermal via 340 as a rectangular block, the thermal via 340 can be any shape that facilitates efficient transport of heat from the write coil arrangement 308 to the substrate 302. For example, the single thermal via 340 can have a trapezoidal shape that resembles the trapezoidal outline of the thermal via arrangement shown in FIG. 5.

Figure 8:
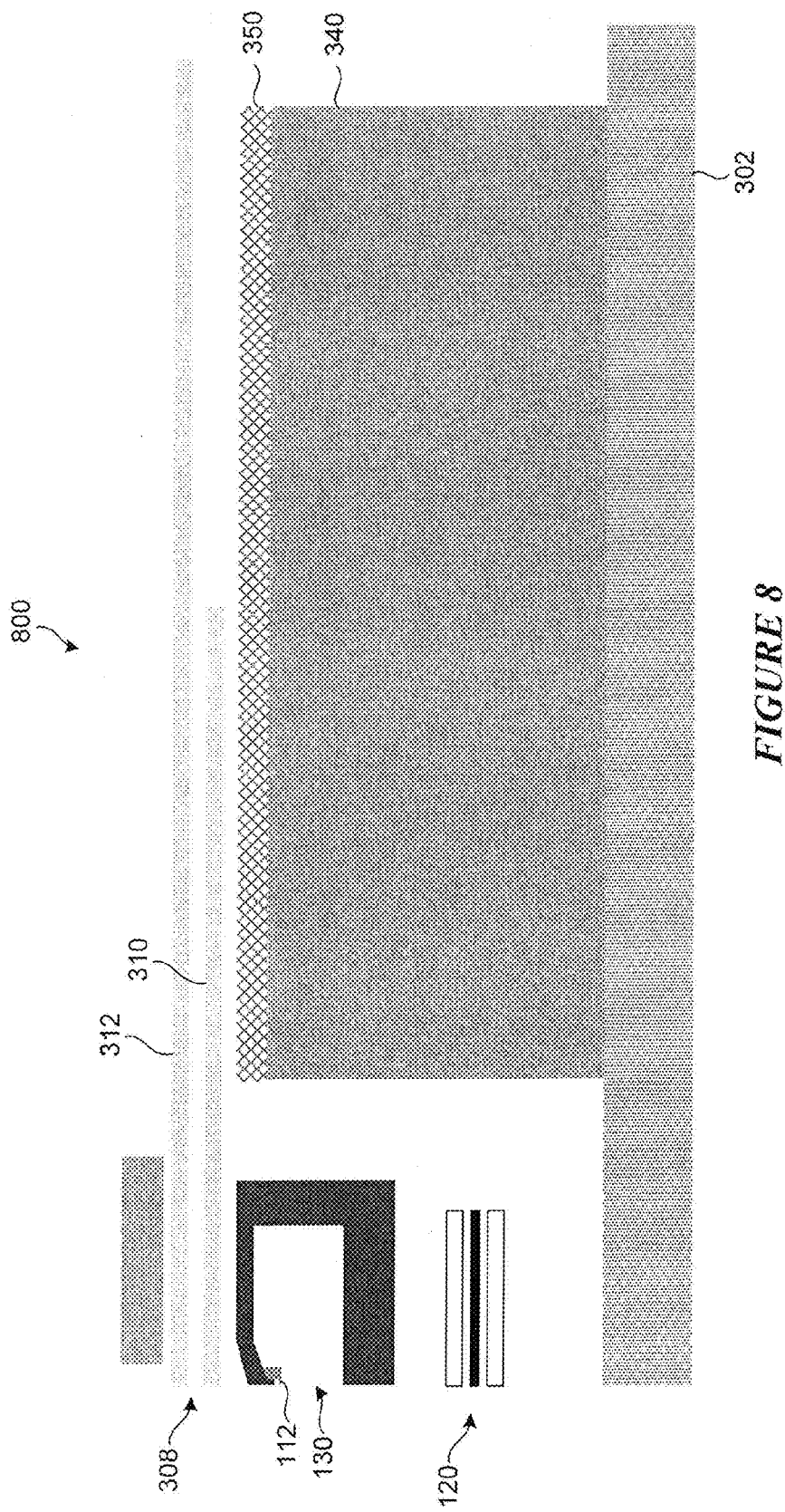
FIG. 8 illustrates a slider which incorporates a unitary thermal via for cooling a write coil arrangement in accordance with other embodiments.

FIG. 8 illustrates an alternative embodiment of a slider 800 that includes a single thermal via 340 formed between the substrate 302 and the write coil arrangement 308. In the embodiment shown in FIG. 8, a thermally conductive dielectric material 350 is disposed between the top surface of the single thermal via 340 and the write coil arrangement 308. In some embodiments, the thermally conductive dielectric material 350 is in contact with the top surface of the single thermal via 340. The thermally conductive dielectric material 350 can be formed using materials previously discussed.

Figure 9:
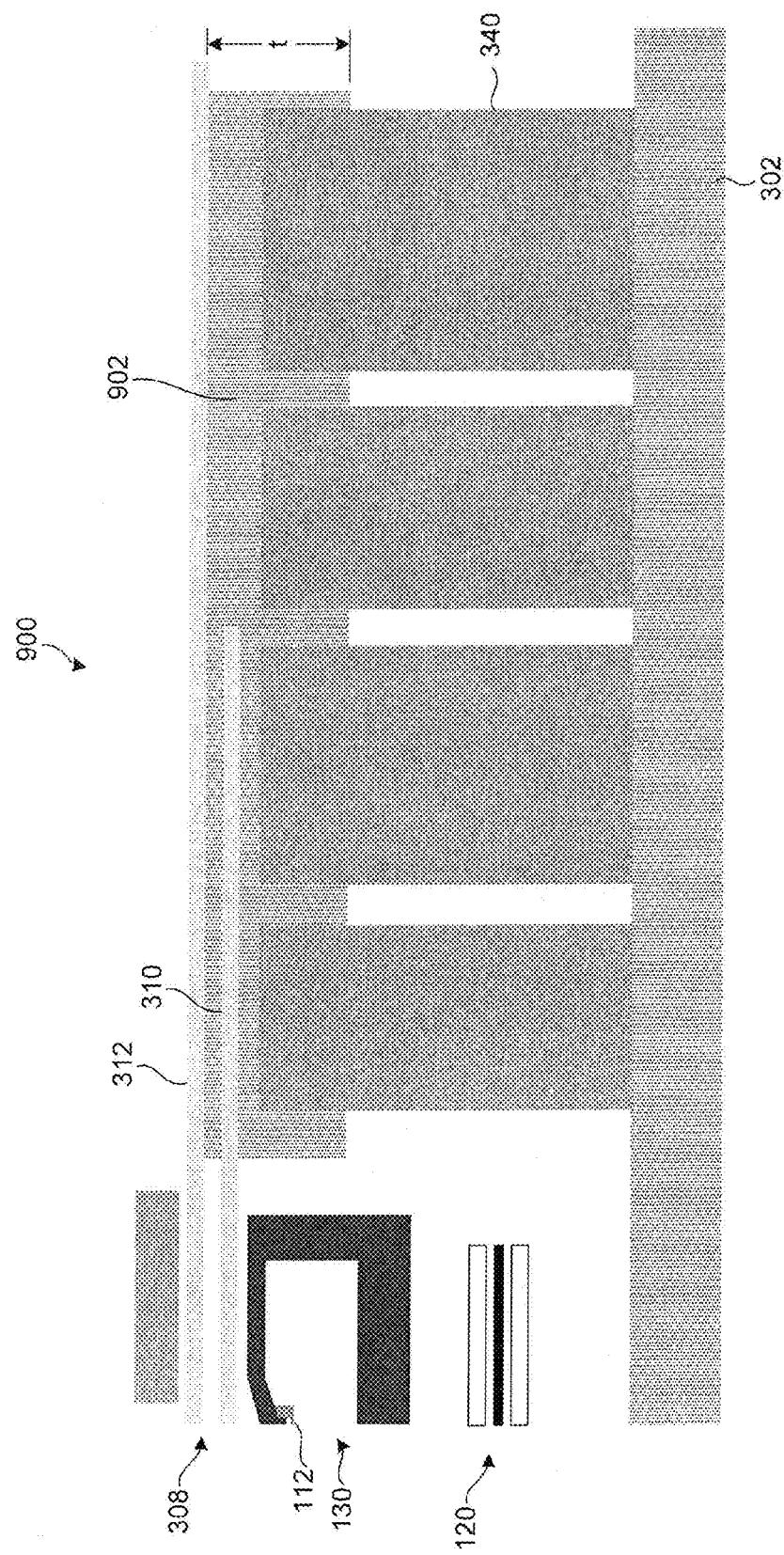
FIG. 9 illustrates a slider which incorporates a multiplicity of thermal vias and a thermal block for cooling a write coil arrangement in accordance with various embodiments.
Figure 10:
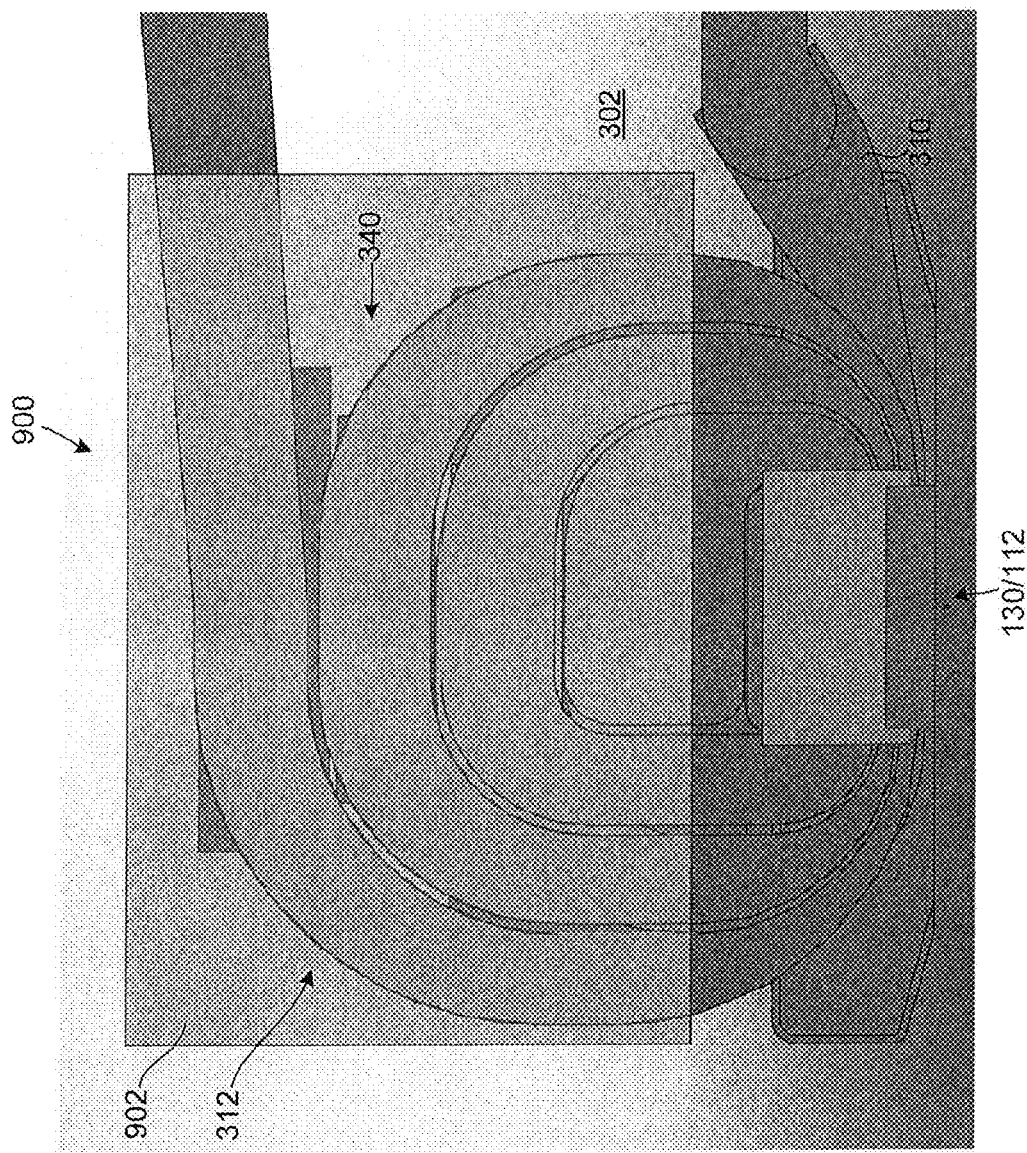
FIG. 10 is a top view of a portion of the slider shown in FIG. 9.
Figure 11:
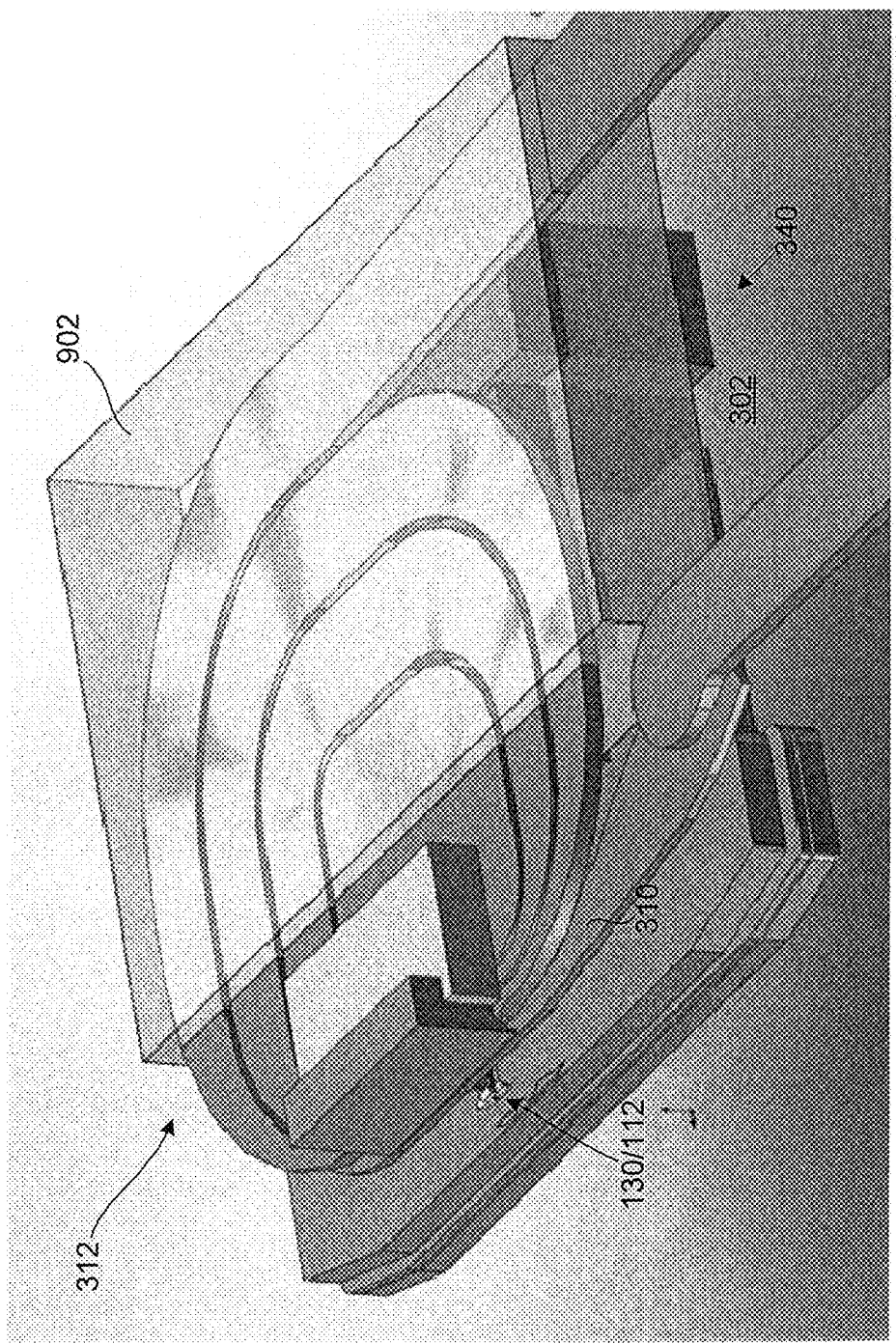
FIG. 11 is a perspective view of a portion of the slider shown in FIG. 9.

FIG. 9 illustrates a slider 900 that incorporates a thermal via arrangement and a thermal block for cooling the write coil arrangement 308 in accordance with various embodiments. The embodiment shown in FIG. 9 is similar to that shown in FIG. 3 but further incorporates a thermal block 902. FIGS. 10 and 11 respectively show a top view and perspective view of the thermal block embodiment illustrated in FIG. 9. The thermal block 902 is in contact with and extends between the thermal vias 340 and the write coil arrangement 308. In the embodiment illustrated in FIG. 9, the thermal block 902 extends from the upper right coil 312, encompasses a significant portion of the lower right coil 310, and contacts the upper region of the thermal vias 340. For example, the thermal block 902 can encompass between about 5-30% of the upper region of the thermal vias 340. In some embodiments, the thermal block 902 can have a thickness, t, that ranges between about 2 and 10 μm (e.g., about 8 μm). The thermal block 902 can be formed from a thermally conductive dielectric material. Suitable dielectric materials include AlN, BeO, MgO, diamond, and graphene, for example.

The thermal block 902 shown in FIG. 9 is illustrated as a unitary block of thermally conductive material. In some embodiments, the thermal block 902 can be formed as a series of individual thermal blocks that extend between the substrate 302 and the write coil arrangement 308. It is believed, however, that a unitary thermal block 902 is more efficient than individual thermal blocks for transporting heat from the write coil arrangement 308 to the substrate 302.

Numerical modeling has demonstrated that inclusion of the thermal block 902 in combination with the thermal vias 340 provides an appreciable reduction in write coil arrangement temperature (and NFT temperature), as is demonstrated by the data shown in FIGS. 12-14. The data shown in FIGS. 12-14 provides a comparison between five different slider designs relative to a baseline slider design. The five different slider designs are indicated as designs A, B, C, D, and E. The baseline slider design is indicated as POR (plan of record). Reference is made to FIG. 9 to facilitate an understanding of each of the slider designs identified in FIGS. 12-14.

The baseline slider design, POR, is represented by the slider 900 shown in FIG. 9 without the thermal vias 340 and the thermal block 902. The absence of these structures in the slider model is indicated in FIG. 12 by the value of 1 in the thermal conductivity data columns labeled k_vias and k_block. The thermal conductivity, k_vias, of the thermal vias 340 for slider designs A-D is 200 W/mK (e.g., representative of Cu), and 55 W/mK for slider design E. The thermal conductivity, k_block, of the thermal block 902 is 1, 10, 25, 50, and 50 W/mK, respectively, for slider designs A-E. The electrical current supplied to the write coil arrangement of the model is 20 mW. The substrate 302 was modeled as a ceramic (e.g., AlTiC) substrate having a thermal conductivity of 24 W/mK.

The data for slider design A (thermal vias present, no thermal block) shows a 9% temperature reduction at the writer coils and a 13% reduction in temperature at the NFT relative to the baseline slider design (POR). The slider designs B-E (thermal vias present, thermal block present) show more than a twofold decrease in write coil and NFT temperature as compared to a slider design with thermal vias only (i.e. slider design A).

The data of FIG. 12 also shows a comparison between the baseline slider design (POR) and the slider design D (thermal vias present, thermal block present) when both the writer and laser diode are energized. This data is indicated next to the energy source identified as W20+L4 (20 mW of current to the writer coils, 4 mW of current to the laser diode). The data indicates a nearly 23% reduction in writer coil temperature and a 21% reduction in NFT temperature when both the writer and laser diode are energized for slider design D relative to the baseline (POR) slider design.

The data of FIG. 12 further shows the pole tip temperature reduction (PT Temp Red [%]) and the WIWP reduction (Wrt Protr Red [%]) for slider designs D and E (thermal vias present, thermal block present) relative to the baseline slider design (POR). This data indicates a 17% and 14% reduction in pole tip temperature for slider designs D and E, respectively, relative to the baseline slider design (POR). This data also indicates a nearly 20% reduction in WIWP for slider designs D and E relative to the baseline slider design (POR).

Figure 15:
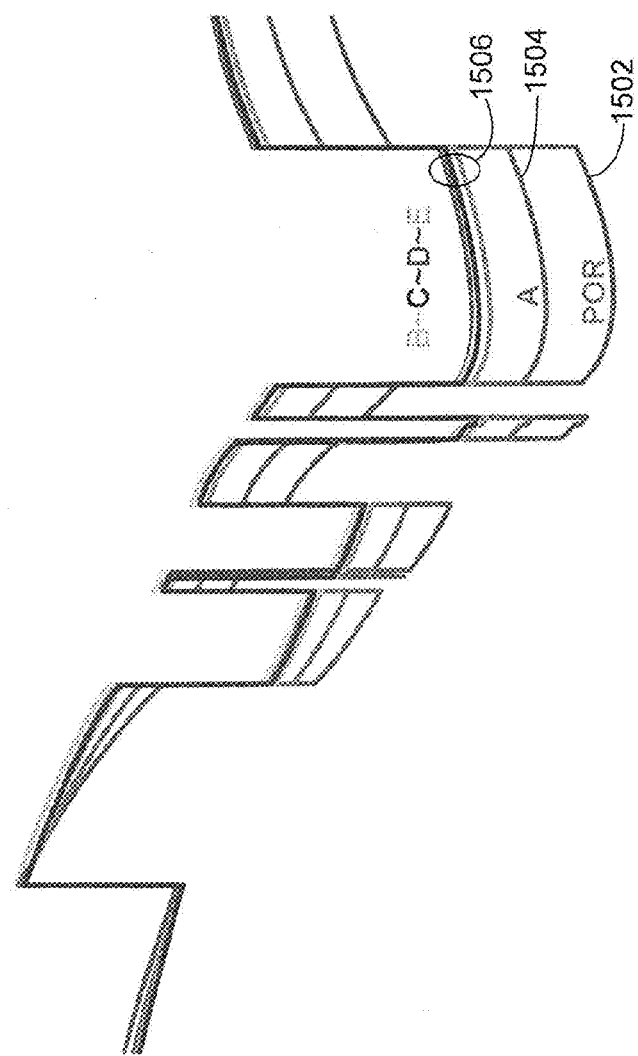
FIG. 15 is a graph showing pole tip protrusion data for each of the slider designs listed in FIG. 12.

FIG. 15 is a graph that illustrates the reduction in WIWP for each of the five slider designs A-E relative to the baseline slider design (POR). The protrusion curve 1502 corresponds to the WIWP data associated with the baseline slider design (POR). The protrusion curve 1504 corresponds to the WIWP data associated with slider design A. The curves labeled 1506 represent individual protrusion curves corresponding to the WIWP data associated with slider designs B-E, respectively. The data illustrated in FIG. 15 shows an appreciable reduction in WIWP for a slider design (design A) that incorporates a thermal vias-only design, and a significantly greater reduction in WIWP for slider designs (designs B-E) that incorporate both thermal vias and a thermal block in accordance with various embodiments.

Embodiments discussed hereinabove provide for a reduction in WIWP by implementing heat sink features near the writer/writer coils. The embodiments shown in FIGS. 16A and 16B provide for a reduction in WIWP achieved by implementing an alternate heat path from the writer to the slider substrate via a return pole of the writer and the reader shields. Various embodiments incorporate a thermal via in the form of one or more heat conduction blocks between the reader shields and the slider substrate, thereby reducing the temperatures in the write pole. The heat from the write coil is partially transferred down into these blocks via the reader shields and the writer return pole, and is eventually dumped into the substrate.

The reduction in WIWP provided by this alternative heat path is estimated to be about 6-8% for an unoptimized design, and higher for an optimized design. The alternative heat path provided by the embodiments shown in FIGS. 16A and 16B achieve a reduction in WIWP without adding more complicated cooling structures near the already crowded writer/NFT region of a HAMR slider.

FIG. 16A shows a slider 1600 which incorporates a thermal via 1610 for cooling a reader 120 in accordance with various embodiments. Cooling the reader 120 serves to form an alternative heat path that sinks heat from the writer 130 to the substrate 302 via the return pole 322 and the reader shields 122 and 124. In the embodiment shown in FIG. 16A, the reader 120 includes a reader element 126 disposed between a first reader shield 122 and a second reader shield 124. The thermal via 1610 is in contact with the substrate 302 and extends to a location proximate the second reader shield 124. In some embodiments, a thermally conductive dielectric layer 1620 is disposed between the second reader shield 124 and the thermal via 1610. In such embodiments, the thermal via 1610 can be formed from a metal or metal alloy having good conductivity, such as Cu, W, Ag, Au, Al, and Ru, for example. In other embodiments, the entire thermal via 1610 can be formed from a thermally conductive dielectric material, such as AlN, BeO, MgO, diamond, and graphene, for example. In such embodiments, the thermally conductive dielectric layer 1620 need not be included. In other embodiments, the reader 120 can be encompassed by the thermal via 1610, as in the manner shown in FIG. 17.

FIG. 16B shows a slider 1650 which incorporates a thermal via 1660 for cooling the write pole 132 of the writer 130 in accordance with various embodiments. Cooling the write pole 132 is achieved by forming an alternative heat path that sinks heat from the writer 130 to the substrate 302 by way of the return pole 322, the reader 120 (reader shields 122 and 124), and the thermal via 1660. According to some embodiments, the thermal via 1660 comprises a multiplicity of metallic heat sinks or blocks 1662, 1664, and 1666. The metallic blocks 1662, 1664, and 1666 can be formed from a metal or metal alloy having good conductivity, such as Cu, W, Ag, Au, Al, and Ru, for example. Each of the blocks 1662, 1664, and 1666 can be formed from the same or a different metal or metal alloy. In some embodiments, the blocks 1662, 1664, and 1666 can be formed from a thermally conductive dielectric material, such as AlN, BeO, MgO, diamond, and graphene, for example.

In FIG. 16B, a reader heater 127 is shown positioned in proximity to the reader 120. The reader heater 127 includes a heating block 129 and a heating element 129'. When activated, heat produced by the reader heater 127 thermally actuates the reader 120. However, heat is also conducted toward the heat sink blocks 1662, 1664, and 1666, which could undesirably redirect heat back to the reader shields 124, 126. In order to reduce this undesirable redirection of heat back to the reader 120, the heat sink blocks 1662, 1664, and 1666 are progressively staggered in terms of height into the body of the slider 1650. More particularly, the heat sink block 1662 positioned closest to the reader heater 127 has the shortest height. The second heat sink block 1164, which is father away from the reader heater 127 than the first heat sink block 1662, has a height which is greater than that of the first heat sink block 1662. The third heat sink block 1166, which is father away from the reader heater 127 than the first and second heat sink blocks 1662 and 1664, has a height which is greater than that of the first and second heat sink blocks 1662 and 1664. Staggering of the heat sink blocks 1662, 1664, and 1666 in the manner shown in FIG. 16B serves to progressively reduce the surface area of the blocks 1662, 1664, and 1666 based on proximity to the reader heater 127, while providing an effective thermal pathway for conducting heat (generated at the write pole/NFT region) from the reader shields 122 and 124 to the substrate 302.

It is understood that the number of thermally conductive blocks can differ from the three blocks shown in FIG. 16B. For example, the thermal via 1660 can be formed by use of two thermally conductive blocks disposed between the second reader shield 124 and the substrate 302. Although not shown in FIG. 16B, a thermally conductive dielectric layer can be disposed between the second reader shield 124 and block 1662 of the thermal via 1660. It is also noted that the heat sink blocks 1662, 1664, and 1666 are formed from a conductive material that provides good compliance to facilitate protrusion of the ABS at the region of the reader 120 (e.g., during thermal actuation of the reader 120). This compliance can be defined in terms of Angstroms of reader motion to mW of reader heater power. Aluminum, for example, provides a good balance of thermal conductivity and compliance properties.

Modeling was performed on the slider 1650 illustrated in FIG. 16B and on a slider that excluded the thermal via 1660 shown in FIG. 16B. WIWP was measured for each of the sliders using the same writer power (12.27 mW) with no power delivered to the writer or reader heaters. WIWP for the slider 1650 was measured at 1.87 nm. WIWP for the slider lacking the thermal via 1660 was measured at 2.04 nm. Results of the modeling demonstrated that the slider 1650 achieved a reduction in WIWP of about 8% relative to the slider lacking the thermal via 1660.

Figure 17:
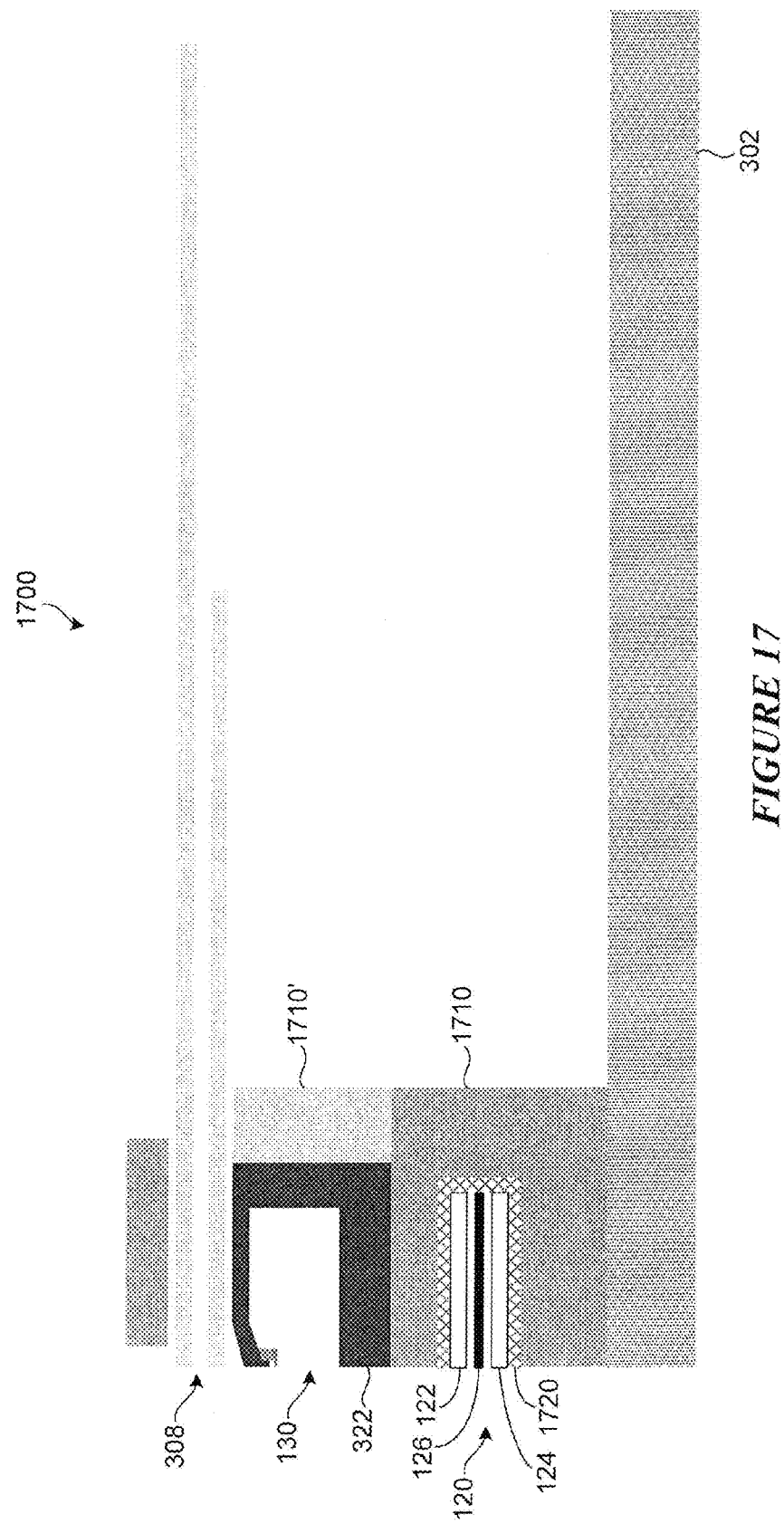
FIG. 17 shows a slider which incorporates a thermal via for cooling a reader and a writer in accordance with various embodiments.

FIG. 17 shows a slider 1700 which incorporates a thermal via 1710 for cooling a reader 120 and a writer 130 in accordance with various embodiments. In the context of the embodiment shown in FIG. 17, the component writer 130 includes a writer core, a write pole, and return pole or poles, but does not include the write coil arrangement 308. In the embodiment shown in FIG. 17, the thermal via 1710 is in contact with the substrate 302, encompasses much of the reader 120, and extends to the return pole 322 of the writer 130. A thermally conductive dielectric barrier 1720 is formed between the thermal via 1710 and components of the reader 120 (e.g., reader element 126, first reader shield 122, and second reader shield 124). Because the writer 130 is electrically grounded to the substrate 302, the thermal via 1710 can extend to and be in contact with the return pole 322 of the writer 130. Cooling the return pole 322 by way of the thermal via 1710 has the effect of cooling the writer core and write pole of the writer 130. In some embodiments, the thermal via 1710 can extend vertically along a magnetic via (see optional thermal via extension 1710') that connects the return pole 322 with the write pole (see write pole 132 in FIG. 3). It is noted that in embodiments in which the thermal via 1710 is formed from a thermally conductive dielectric material, such as those listed above, the thermally conductive dielectric barrier 1720 need not be included.

Figure 18:
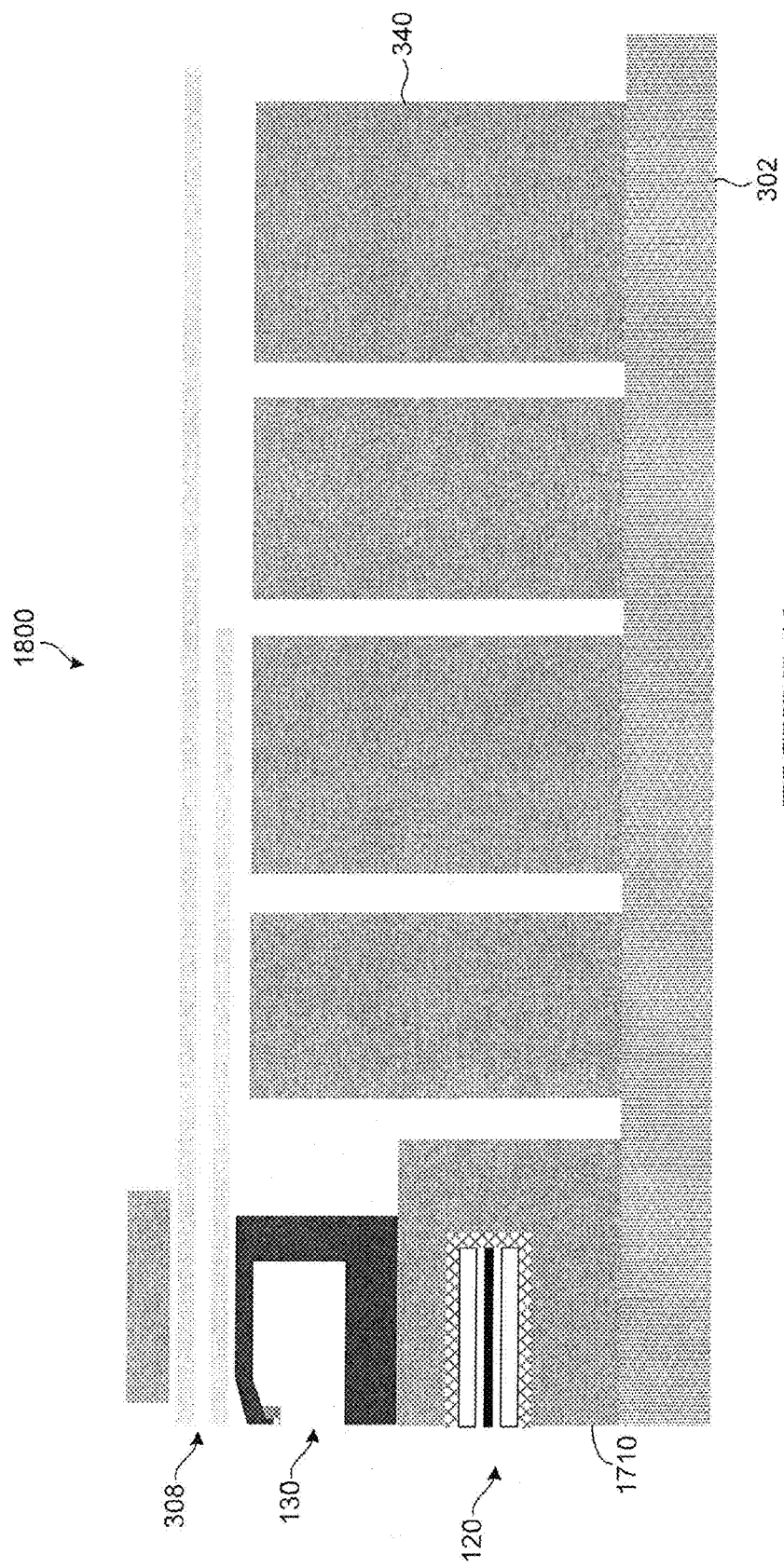
FIG. 18 shows a slider which incorporates a thermal via for cooling a reader, a writer, and a write coil arrangement in accordance with various embodiments.

FIG. 18 shows a slider 1800 which incorporates a multiplicity of thermal vias for cooling a multiplicity of slider components that generate heat when energized in accordance with various embodiments. In the embodiment illustrated in FIG. 18, a thermal via 1710 is configured to provide cooling for the reader 120 and the writer 130 in a manner previously discussed with regard to FIG. 17. A multiplicity of thermal vias 340 provides cooling for the writer coil arrangement 308 in a manner discussed previously with regard to FIGS. 3 and 4. It is noted that a thermally conductive dielectric layer (e.g., layer 350 shown in FIG. 4) can be disposed between the thermal vias 340 and the writer coil arrangement 308.

Figure 19:
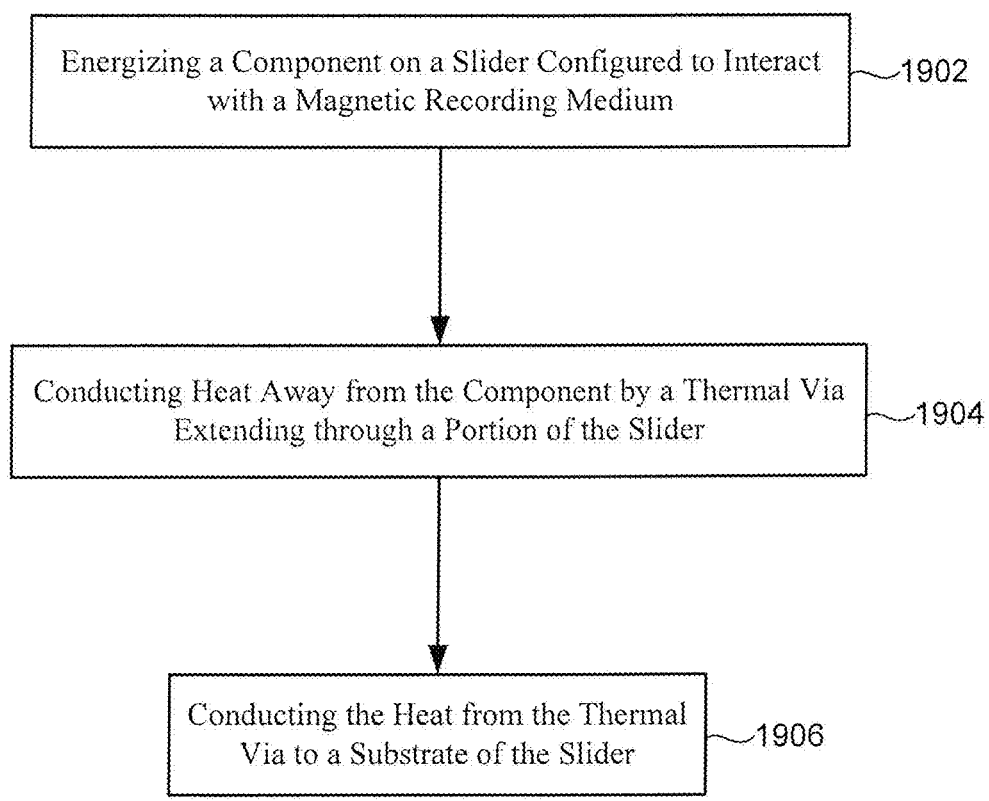
FIG. 19 is a flow diagram of a method for cooling a component of a slider that generates heat when energized in accordance with various embodiments.

Turning now to FIG. 19, there is illustrated a flow diagram of a method for cooling a component of a slider that generates heat when energized in accordance with various embodiments. The method shown in FIG. 19 involves energizing 1902 a component on a slider configured to interact with the magnetic recording medium. The method also involves conducting 1904 heat away from the component by a thermal via extending through a portion of the slider. The method further involves conducting 1906 the heat from the thermal via to a substrate of the slider. In some embodiments, the slider is a conventional slider. In other embodiments, the slider is configured for heat-assisted magnetic recording.

Figure 20A:
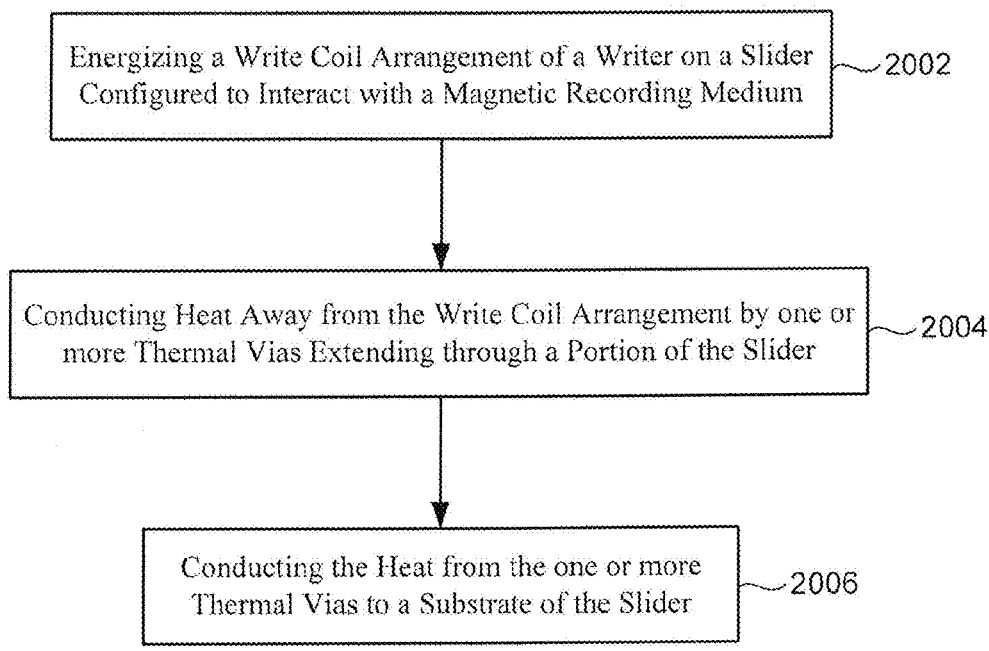
FIG. 20A is a flow diagram of a method for cooling a write coil arrangement of a slider in accordance with various embodiments.

FIG. 20A is a flow diagram of a method for cooling a write coil arrangement of a slider in accordance with various embodiments. The method shown in FIG. 20 involves energizing 2002 a write coil arrangement of a writer on the slider configured to interact with the magnetic recording medium. The method also involves conducting 2004 heat away from the write coil arrangement by one or more thermal vias extending through a portion of the slider. The method further involves conducting 2006 the heat from the one or more thermal vias to a substrate of the slider. In some embodiments, the slider is a conventional slider. In other embodiments, the slider is configured for heat-assisted magnetic recording.

Figure 20B:
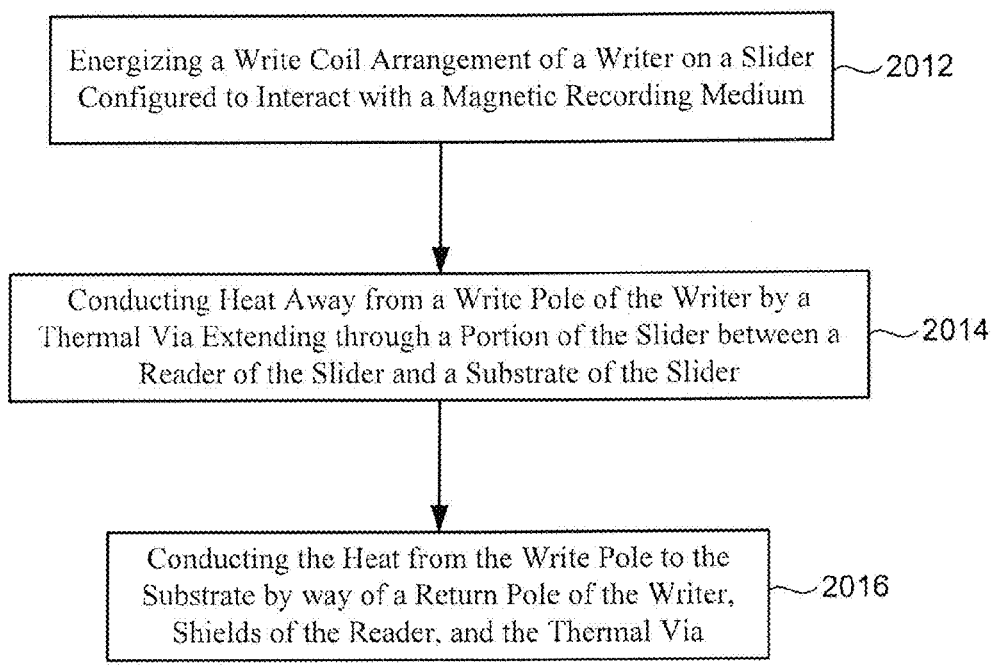
FIG. 20B is a flow diagram of a method for cooling a write pole of a slider in accordance with various embodiments.

FIG. 20B is a flow diagram of a method for cooling a write pole of a slider in accordance with various embodiments. The method shown in FIG. 20B involves energizing 2012 a write coil arrangement of a writer on the slider configured to interact with the magnetic recording medium. The method also involves conducting 2014 heat away from the write pole of the writer by a thermal via extending through a portion of the slider between a reader and a substrate of the slider. The method further involves conducting 2016 the heat from the write pole to the substrate by way of a return pole of the writer, shields of the reader, and the thermal via. In some embodiments, the slider is a conventional slider. In other embodiments, the slider is configured for heat-assisted magnetic recording.

Figure 21:
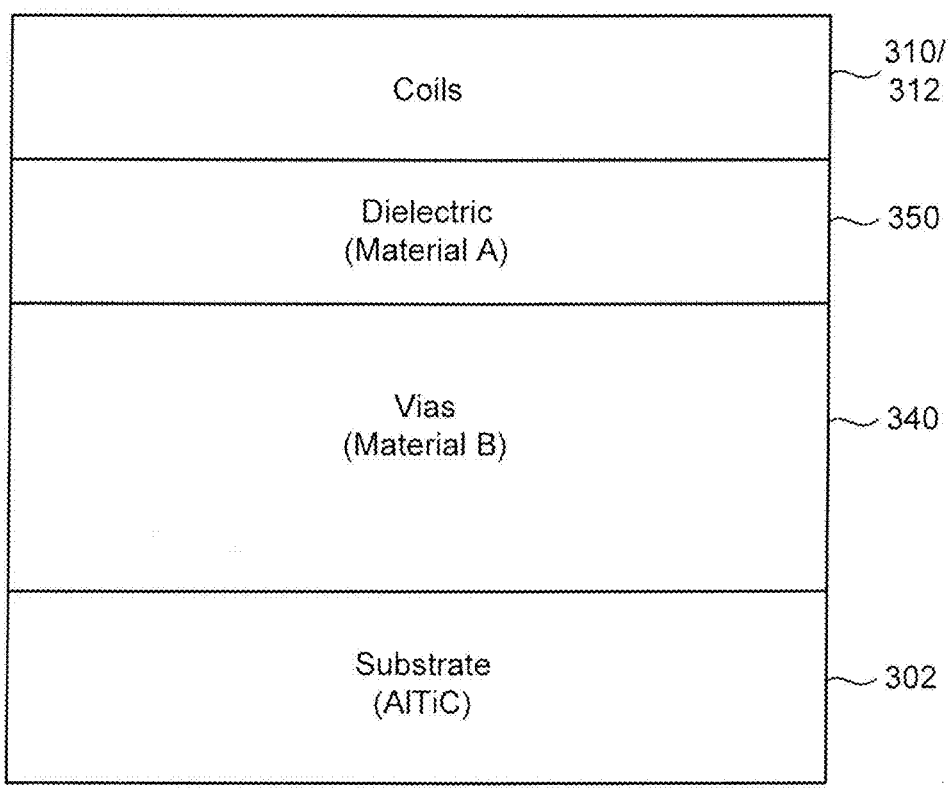
FIG. 21 is a cross-sectional view of a representative slider according to various embodiments, such as those shown in FIG. 4, 8, 9.

FIG. 21 is a cross-sectional view of a representative slider according to various embodiments, such as those shown in FIG. 4, 8, 9. The cross-section of the slider shown in FIG. 21 includes a substrate 302, one or more vias 340 adjacent the substrate 302, a dielectric layer 350 adjacent the vias 340, and at least one coil 310/312 adjacent the dielectric layer 350. For purposes of illustration and not of limitation, the dielectric layer 350 can be formed from a first material (Material A) and vias 340 can be formed from a second material (Material B). Table 1 below lists dimensions and thermal resistances for different representative combinations of materials (Materials A and B) that can be used to form the dielectric layer 350 and the vias 340 in accordance with various embodiments.

TABLE 1

| Material Thermal Conductivity (TC) (W/mK) | | | | Lengths (m) | Area (m²) | Thermal Resistance ($R_{th}$) (K/W) |
|---|---|---|---|---|---|---|
| A | TC | B | TC | | | |
| AlO | 1.35 | AlO | 1.35 | 1.00E−06 | 1.41E−04 | 3.00E−09 | 35061.7 |
| AlO | 1.35 | Cu | 200 | 1.00E−06 | 1.41E−04 | 3.00E−09 | 481.9 |
| MgO | 50 | Cu | 200 | 1.00E−06 | 1.41E−04 | 3.00E−09 | 241.7 |
| AlO | 1.35 | Cu | 200 | 1.00E−06 | 1.41E−04 | 6.00E−09 | 241.0 |
| MgO | 50 | Cu | 200 | 1.00E−06 | 1.41E−04 | 6.00E−09 | 120.8 |

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. An apparatus, comprising:
a slider configured for heat assisted magnetic recording and comprising a substrate, a writer, a write coil arrangement, and a reader comprising a pair of reader shields, the reader situated between the substrate and the writer;
at least one component of the slider that generates heat when energized;
a plurality of thermal vias extending through the slider and comprising:
at least one first thermal via extending through a portion of the slider from a location proximate the reader to the substrate, the thermal via configured to conduct heat away from the component and to the substrate along a heat path that includes the reader shields; and
at least one second thermal via extending through a portion of the slider from a location proximate the write coil arrangement to the substrate and configured to conduct heat away from the write coil arrangement and to the substrate.

2. The apparatus of claim 1, wherein:
the substrate is situated on a first plane of the slider;
the component is situated on a second plane of the slider parallel to and spaced apart from the first plane; and
the first thermal via extends through the portion of the slider between the first plane and a location proximate the second plane.

3. The apparatus of claim 1, wherein:
a plurality of components of the slider are configured to generate heat when energized; and
one of a plurality of the first thermal vias extends from a location proximate each of the components to the substrate.

4. The apparatus of claim 3, wherein:
the substrate is situated on a first plane of the slider;
each of the plurality of components is situated on a different plane of the slider parallel to and spaced apart from the first plane; and
one of the plurality of the first thermal vias extends from a location proximate each of the components to the substrate.

5. The apparatus of claim 1, wherein the at least one component comprises a writer core.

6. The apparatus of claim 1, wherein the at least one component comprises a return pole of the writer.

7. The apparatus of claim 1, wherein the at least one component comprises the reader.

8. The apparatus of claim 1, wherein:
the writer comprising a core and a return pole; and
at least two of the first thermal vias extend from the substrate to a location proximate the reader and to at least one of the writer core and return pole.

9. The apparatus of claim 1, where the at least one first via comprises a plurality of staggered thermal blocks.

10. The apparatus of claim 1, further comprising a thermally conductive dielectric material disposed between the at least one first thermal via and the reader.

11. An apparatus, comprising:
a slider having a substrate and comprising:
a writer comprising a write pole, a return pole, and a write coil arrangement;
a reader comprising a pair of reader shields, the reader situated between the substrate and the writer;
an optical waveguide configured to receive light from a light source;
a near-field transducer proximate the write pole and the optical waveguide;
a first thermal via extending through a portion of the slider from a location proximate the reader to the substrate, the first thermal via configured to conduct heat away from one or more heat producing components of the slider to the substrate along a heat path that includes the reader shields; and
one or more second thermal vias extending through a portion of the slider from a location proximate the write coil arrangement to the substrate, the one or more second thermal vias configured to conduct heat away from the write coil arrangement and to the substrate.

12. The apparatus of claim 11, wherein a plurality of the second thermal vias extend from a plurality of spaced-apart locations proximate the write coil arrangement to the substrate.

13. The apparatus of claim 11, wherein:
the write coil arrangement comprises a plurality of coil turns each separated by a spacing; and
each of a plurality of the second thermal vias is positioned proximate one of the plurality of coil turns.

14. The apparatus of claim 11, wherein the first and second thermal vias comprise Cu, W, Ag, Au, Al, Ru, AlN, BeO, MgO, diamond or graphene.

15. The apparatus of claim 11, wherein the first thermal via comprises a plurality of staggered thermal blocks.

16. The apparatus of claim 11, further comprising a thermally conductive dielectric material disposed between the first thermal via and the reader and between the one or more second thermal vias and the write coil arrangement.

17. The apparatus of claim 11, wherein one of the second thermal vias extends from the substrate to a location proximate one or both of the return pole and core of the writer.

18. The apparatus of claim 11, wherein the one or more second thermal vias comprises a plurality of metallic heat sinks.

* * * * *